(12) United States Patent
Soliman et al.

(10) Patent No.: US 9,332,509 B2
(45) Date of Patent: *May 3, 2016

(54) TRANSMIT POWER CONTROL SYSTEMS, DEVICES, AND METHODS

(71) Applicant: QUALCOMM Incorporated, San Diego, CA (US)

(72) Inventors: Samir Salib Soliman, Poway, CA (US); Ozgur Dural, San Diego, CA (US); Soumya Das, San Diego, CA (US); Edwin C. Park, San Diego, CA (US); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/763,685

(22) Filed: Feb. 10, 2013

(65) Prior Publication Data

US 2014/0226498 A1    Aug. 14, 2014

(51) Int. Cl.
   *H04W 52/36*   (2009.01)
   *H04W 52/22*   (2009.01)
   *H04W 52/60*   (2009.01)

(52) U.S. Cl.
   CPC .......... *H04W 52/362* (2013.01); *H04W 52/221* (2013.01); *H04W 52/60* (2013.01); *Y02B 60/50* (2013.01)

(58) Field of Classification Search
   None
   See application file for complete search history.

(56) References Cited

U.S. PATENT DOCUMENTS

| | | | | |
|---|---|---|---|---|
| 6,212,399 | B1 * | 4/2001 | Kumar et al. | 455/522 |
| 6,334,047 | B1 * | 12/2001 | Andersson et al. | 455/69 |
| 6,389,296 | B1 * | 5/2002 | Shiraki et al. | 455/522 |
| 6,680,927 | B2 * | 1/2004 | Yano et al. | 370/335 |
| 6,801,759 | B1 | 10/2004 | Saifuddin | |
| 6,816,507 | B1 * | 11/2004 | Jarbot et al. | 370/465 |
| 2001/0036813 | A1 * | 11/2001 | Baker et al. | 455/69 |

(Continued)

FOREIGN PATENT DOCUMENTS

| | | |
|---|---|---|
| EP | 1139685 A1 | 10/2001 |
| WO | WO-9726716 A2 | 7/1997 |

(Continued)

OTHER PUBLICATIONS

"Optimum TPC Command Sequence in WCDMA", IEEE, 2001.*

(Continued)

*Primary Examiner* — Habte Mered
(74) *Attorney, Agent, or Firm* — Holland & Hart LLP

(57) ABSTRACT

Methods, systems, and devices are provided that may address problems pertaining to effective transmit power control of a communications device operating in a wireless communications system. Some embodiments utilize mechanisms or techniques with dynamically adaptive steps sizes for transmit power control based on one or more trends. Some of these techniques may identify a trend in the transmit power control (TPC) commands and may adapt a TPC step size as a result. Other techniques may be utilized in which transmit power control is based on multiple interference estimates in a frame slot. Having multiple interference estimates at sub-slot intervals may provide additional transmit power control by allowing more transmit power adjustments, or more appropriate adjustments, for each slot. Metric calculations may be performed on one or more techniques to determine appropriate TPC operations.

40 Claims, 32 Drawing Sheets

(56) References Cited

U.S. PATENT DOCUMENTS

| | | |
|---|---|---|
| 2002/0016179 A1 | 2/2002 | Baker et al. |
| 2002/0031105 A1 | 3/2002 | Zeira et al. |
| 2002/0051438 A1 | 5/2002 | Yano et al. |
| 2002/0173331 A1* | 11/2002 | Noh ............................ 455/522 |
| 2005/0036441 A1* | 2/2005 | Laroia et al. .................. 370/203 |
| 2006/0252451 A1 | 11/2006 | Cho et al. |
| 2007/0173278 A1* | 7/2007 | Yoon et al. .................... 455/522 |
| 2007/0217348 A1 | 9/2007 | Tapia Moreno et al. |
| 2008/0102877 A1 | 5/2008 | Suemitsu et al. |
| 2008/0227414 A1 | 9/2008 | Karmi et al. |
| 2010/0087219 A1 | 4/2010 | Jonsson et al. |
| 2010/0103847 A1 | 4/2010 | Karlsson |
| 2010/0157895 A1* | 6/2010 | Pani et al. ..................... 370/328 |
| 2010/0158147 A1* | 6/2010 | Zhang et al. .................. 375/260 |
| 2011/0235682 A1* | 9/2011 | He et al. ....................... 375/132 |
| 2012/0039209 A1 | 2/2012 | Zeira et al. |
| 2014/0226499 A1 | 8/2014 | Soliman et al. |
| 2014/0247814 A1 | 9/2014 | Zhang et al. |

FOREIGN PATENT DOCUMENTS

| | | |
|---|---|---|
| WO | WO-0074261 A1 | 12/2000 |
| WO | WO-0184740 A2 | 11/2001 |
| WO | WO-02071645 A2 | 9/2002 |
| WO | WO-03067783 A2 | 8/2003 |
| WO | WO-2005069504 A1 | 7/2005 |
| WO | WO-2007078160 A2 | 7/2007 |
| WO | WO-2012155354 A1 | 11/2012 |

OTHER PUBLICATIONS

ISA/EPO, Communication Relating to the Results of the Partial International Search, International Patent App. No. PCT/US2014/014861, Apr. 1, 2014, European Patent Office, Rijswijk, NL, 7 pgs.

ISA/EPO, International Search Report and Written Opinion, International Patent App. No. PCT/US2014/014861, Jun. 4, 2014, European Patent Office, Rijswijk, NL, 17 pgs.

* cited by examiner

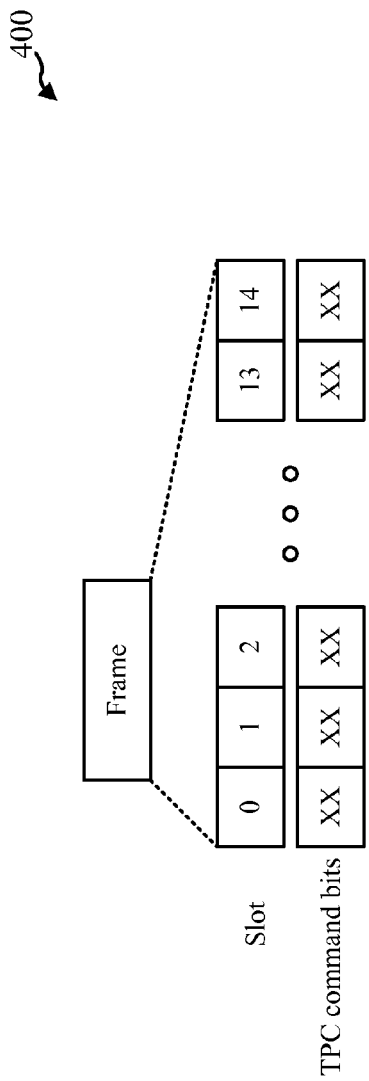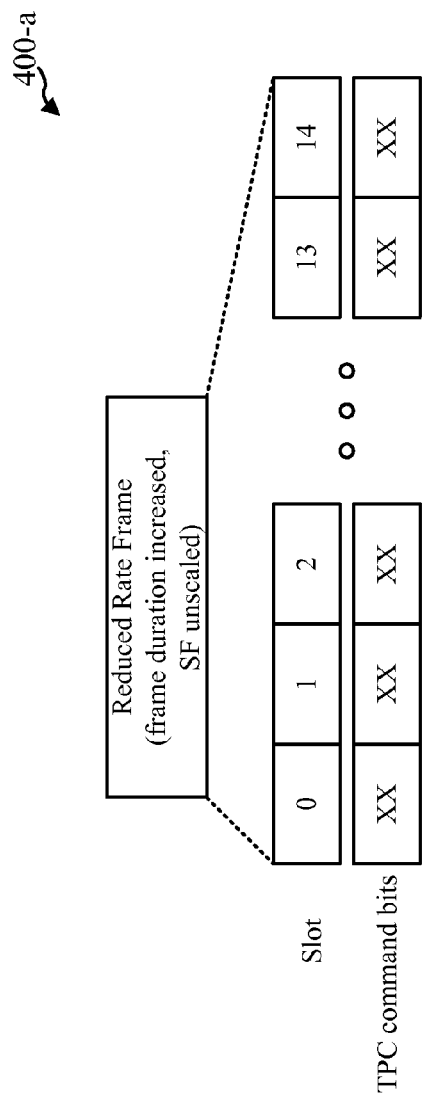

| T0 | Step | T1 | Step | T2 | Step | T3 | Step |
|----|------|----|------|----|------|----|------|
| 00 | $-\Delta$ | 00 | $-\Delta$ | 00 | $-2\Delta$ | 00 | $-\Delta$ |
| 11 | $+\Delta$ | 11 | $+\Delta$ | 11 | $+2\Delta$ | 11 | $+\Delta$ |

FIG. 7

| T0 | Step | T1 | Step | T2 | Step | T3 | Step |
|---|---|---|---|---|---|---|---|
| 00 | $-\Delta$ | 00 | $-\Delta-\delta$ | 00 | $-\Delta-2\delta$ | 00 | $-\Delta-3\delta$ |
| 01 | No change | 01 | $-\Delta+\delta$ | 01 | $-\Delta$ | 01 | $-\Delta-\delta$ |
| 10 | No change | 10 | $+\Delta-\delta$ | 10 | $+\Delta$ | 10 | $+\Delta+\delta$ |
| 11 | $+\Delta$ | 11 | $+\Delta+\delta$ | 11 | $+\Delta+2\delta$ | 11 | $+\Delta+3\delta$ |

FIG. 10A

| T0 | Step | T1 | Step | T2 | Step | T3 | Step |
|---|---|---|---|---|---|---|---|
| 00 | $-\Delta$ | 01 | $-\Delta+\delta$ | 11 | $+\Delta+2\delta$ | 00 | $-\Delta-3\delta$ |

| T0 | Step | T1 | Step | T2 | Step | T3 | Step |
|---|---|---|---|---|---|---|---|
| 00 | $-\Delta$ | 01 | No Change | 11 | $+\Delta+2\delta$ | 00 | $-\Delta-3\delta$ |

| T0 | Step | T1 | Step | T2 | Step | T3 | Step |
|---|---|---|---|---|---|---|---|
| 00 | $-\Delta$ | 01 | No Change | 11 | $+\Delta$ | 00 | $-\Delta-3\delta$ |

| T0 | Step | T1 | Step | T2 | Step | T3 | Step |
|---|---|---|---|---|---|---|---|
| 00 | $-\Delta$ | 01 | No Change | 11 | $+\Delta$ | 00 | $-\Delta-\delta$ |

| T0 | Step | T1 | Step | T2 | Step | T3 | Step |
|---|---|---|---|---|---|---|---|
| 0000 | $-\Delta$ | 0000 | $-\Delta-\delta$ | 0000 | $-\Delta-2\delta$ | 0000 | $-\Delta-3\delta$ |
| 0101 | No change | 0101 | $-\Delta+\delta$ | 0101 | $-\Delta$ | 0101 | $-\Delta-\delta$ |
| 1010 | No change | 1010 | $+\Delta-\delta$ | 1010 | $+\Delta$ | 1010 | $+\Delta+\delta$ |
| 1111 | $+\Delta$ | 1111 | $+\Delta+\delta$ | 1111 | $+\Delta+2\delta$ | 1111 | $+\Delta+3\delta$ |

FIG. 12B 1200-a

| T0 | Step | T1 | Step | T2 | Step | T3 | Step |
|---|---|---|---|---|---|---|---|
| 0000 | $-\Delta$ | 0000 | $-\Delta-\delta$ | 0000 | $-\Delta-2\delta$ | 0000 | $-\Delta-3\delta$ |
| 0001 | No change | 0001 | $-\Delta+\delta$ | 0001 | $-\Delta$ | 0001 | $-\Delta-\delta$ |
| 1110 | No change | 1110 | $+\Delta-\delta$ | 1110 | $+\Delta$ | 1110 | $+\Delta+\delta$ |
| 1111 | $+\Delta$ | 1111 | $+\Delta+\delta$ | 1111 | $+\Delta+2\delta$ | 1111 | $+\Delta+3\delta$ |

1400

| T0 | Step |
|----|------|
| 00 | $-2\Delta$ |
| 01 | $-\Delta$ |
| 10 | $+\Delta$ |
| 11 | $+2\Delta$ |

FIG. 14

TRANSMIT POWER CONTROL SYSTEMS, DEVICES, AND METHODS

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Wireless communications systems may make adjustments to transmit power on a regular basis if need be. For example, with Universal Mobile Telecommunications System (UMTS), a rate at which a transmit power may be adjusted is typically 1500 Hertz (Hz). The transmit power control (TPC) mechanism used to make transmit power adjustments has, in some examples, relied on fixed steps sizes of 1 dB or 2 dB and one TPC command per slot, with 15 slots per 10 millisecond (ms) frame, for example. Other TPC rates are also specified for UMTS such as a 300 Hz rate for uplinks (i.e., from user equipment to base station) and a 500 Hz rate for downlinks (i.e., from base station to user equipment). These other TPC rates, however, have generally not been implemented. In addition to the TPC rates described above, CDMA 1x may perform TPC at a rate of 800 Hz and CDMA 1x-Advanced may allow TPC rates of 400 Hz and 200 Hz.

In some examples, utilizing lower TPC rates need not necessarily impact negatively the link efficiency in all scenarios. There are situations where the TPC rate is reduced or scaled down and there may be benefits in facilitating better transmit power control with the lower TPC rates. Moreover, there may be benefits in addressing TPC mechanisms that may facilitate more effective or rapid control of transmit power over a range of TPC rates.

SUMMARY

Methods, systems, and devices are provided that may address problems pertaining to effective transmit power control of a communications device in a wireless communications system. Some embodiments utilize techniques with dynamically adaptive steps sizes for transmit power control based on one or more trends. These adaptive step size techniques need not involve changes to the manner in which certain aspects of the TPC mechanisms operate but may involve the assignment or mapping of different step sizes to TPC commands. For example, some techniques may identify a trend in the TPC commands and may adapt a TPC step size as a result.

Other embodiments utilize techniques that provide transmit power control based on multiple interference estimates (e.g., signal-to-interference ratio or SIR estimates) in a frame slot. Utilizing multiple interference estimates at sub-slot intervals may provide sub-granularity of transmit power control by allowing more than one transmit power adjustments, or more appropriate adjustments, for each slot. These techniques may be applied to a standard TPC rate, such as 1500 Hz, which may involve changes to the specification and implementation. These techniques may also be applied to reduced TPC rates, such as 1500 Hz/N, where N is a bandwidth scaling factor. Utilizing these techniques with reduced TPC rates need not involve changes to existing algorithms or specifications but may involve the assignment or mapping of different step sizes to TPC commands, similar to adaptive step size techniques.

Some embodiments utilize normal bandwidth carrier system such as a Universal Mobile Telecommunication System (UMTS) and/or flexible bandwidth carrier systems such as a flexible UMTS (F-UMTS). Flexible bandwidth carrier systems may involve wireless communications systems that may utilize portions of spectrum that may not be big enough to fit a normal waveform utilizing flexible waveforms. A flexible bandwidth carrier system may be generated with respect to a normal carrier bandwidth system through dilating, or scaling down, the time or the chip rate of the flexible bandwidth carrier system with respect to the normal carrier bandwidth system. Some embodiments increase the bandwidth of a flexible waveform through expanding, or scaling up, the time or the chip rate of the flexible carrier bandwidth system.

A method for transmit power control in a wireless communications system includes identifying at least one trend with respect to two or more TPC commands and adapting a TPC step size based on the identified at least one trend. In some embodiments, a reduced TPC rate is identified and the identified reduced TPC rate is compensated through the adapted TPC step size. The reduced TPC rate may include a normal TPC rate for a normal bandwidth carrier system scaled with a bandwidth scaling factor for a flexible bandwidth carrier system. In some embodiments, identifying the at least one trend includes identifying a major trend and identifying a minor trend, where adapting the TPC step size is based on at least the identified major trend or the identified minor trend. The identified major trend may indicate a first component of the TPC step size and the identified minor trend may indicate a second component of the TPC step size smaller than the first component. In some embodiments, identifying the at least one trend includes identifying that a same TPC command has been utilized two or more consecutive times.

In some embodiments, a reduced spreading factor is identified, where the reduced spreading factor includes a normal spreading factor for a normal bandwidth carrier system scaled with a bandwidth scaling factor for a flexible bandwidth carrier system. The TPC step size may be adapted with additional TPC command bits resulting from the reduced spreading factor. In some embodiments, a source of TPC command bits is identified. The TPC step size may be adapted with additional TPC command bits resulting from the identified source of TPC command bits. The additional TPC command bits may result in a TPC command in which one or more of most significant bits represent a major trend and one or more of least significant bits represent a minor trend.

In some embodiments, a current metric is determined with respect to a current TPC mechanism that supports adapting the TPC step size based on the identified at least one trend. The current metric may be compared to a reference metric with respect to a reference TPC mechanism and the TPC operations may be adapted based on the comparison. Determining the current metric may include determining an ideal power with respect to the current TPC mechanism, determining a received power with respect to the current TPC mechanism, and calculating the current metric based on a time average of difference between the received power and the ideal power. Adapting the TPC operations may include selecting one of the current TPC mechanism and the reference TPC mechanism to perform the TPC operations.

In some embodiments, a wireless communications system includes means for identifying at least one trend with respect to two or more TPC commands and means for adapting a TPC step size based on the identified at least one trend. In some embodiments, the wireless communications system also includes means for identifying a reduced TPC rate and means for compensating the identified reduced TPC rate through the adapted TPC step size. The reduced TPC rate may include a normal TPC rate for a normal bandwidth carrier system scaled with a bandwidth scaling factor for a flexible bandwidth carrier system. In some embodiments, the means for identifying the at least one trend include means for identifying a major trend and means for identifying a minor trend, where adapting the TPC step size is based on at least the identified major trend or the identified minor trend. In some embodiments, the means for identifying the at least one trend include means for identifying that a same TPC command has been utilized two or more consecutive times.

In some embodiments, the wireless communications system also includes means for identifying a reduced spreading factor, where the reduced spreading factor includes a normal spreading factor for a normal bandwidth carrier system scaled with a bandwidth scaling factor for a flexible bandwidth carrier system, and means for adapting the TPC step size with additional TPC command bits resulting from the reduced spreading factor. In some embodiments, the wireless communications system also includes means for identifying a source of TPC commands bits and means for adapting the TPC step size with additional TPC command bits resulting from the identified source of TPC commands. The additional TPC command bits may result in a TPC command in which one or more of most significant bits represent a major trend and one or more of least significant bits represent a minor trend.

In some embodiments, the wireless communications system also includes means for determining a current metric with respect to a current TPC mechanism that supports adapting the TPC step size based on the identified at least one trend, means for comparing the current metric to a reference metric with respect to a reference TPC mechanism, and means for adapting TPC operations based on the comparison. The means for determining the current metric may include means for determining an ideal power with respect to the current TPC mechanism, means for determining a received power with respect to the current TPC mechanism, and means for calculating the current metric based on a time average of a difference between the received power and the ideal power.

In some embodiments, a wireless communication device includes at least one processor communicatively coupled with a memory, where the memory has executable code that, when executed by the at least one processor, causes the at least one processor to identify at least one trend with respect to two or more TPC commands and adapt a TPC step size based on the identified at least one trend. In some embodiments, the executable code causes the at least one processor to identify a reduced TPC rate and compensate for the identified reduced TPC rate through the adapted TPC step size. In some embodiments, the executable code causes the at least one processor to identify a major trend and identify a minor trend, where the adaptation of the TPC step size is based on at least the identified major trend or the identified minor trend. In some embodiments, the executable code causes the at least one processor to identify that a same TPC command has been utilized two or more consecutive times.

In some embodiments, the executable code causes the at least one processor to identify a reduced spreading factor, where the reduced spreading factor includes a normal spreading factor for a normal bandwidth carrier system scaled with a bandwidth scaling factor for a flexible bandwidth carrier system, and to adapt the TPC step size with additional TPC command bits resulting from the reduced spreading factor. In some embodiments, the executable code causes the at least one processor to identify a source of TPC commands bits and adapt the TPC step size with additional TPC command bits resulting from the identified source of TPC commands. The additional TPC command bits may result in a TPC command in which one or more of most significant bits represent a major trend and one or more of least significant bits represent a minor trend.

In some embodiments, the executable code causes the at least one processor to determine a current metric with respect to a current TPC mechanism that supports adaptation of the TPC step size based on the identified at least one trend, compare the current metric to a reference metric with respect to a reference TPC mechanism, and adapt TPC operations based on the comparison. In some embodiments, the executable code causes the at least one processor to determine an ideal power with respect to the current TPC mechanism, determine a received power with respect to the current TPC mechanism, and calculate the current metric based on a time average of a difference between the received power and the ideal power.

In some embodiments, a computer program product for transmit power control in a wireless communications system includes a non-transitory computer-readable medium having code configured to identify at least one trend with respect to two or more TPC commands and code configure to adapt a TPC step size based on the identified at least one trend. In some embodiments, the non-transitory computer-readable medium includes code configured to identify a major trend and code configured to identify a minor trend, and wherein adaptation of the TPC step size is based on at least the identified major trend or the identified minor trend. In some embodiments, the non-transitory computer-readable medium includes code configured to identify that a same TPC command has been utilized two or more consecutive times.

In some embodiments, the non-transitory computer-readable medium includes code configured to identify a reduced spreading factor, where the reduced spreading factor includes a normal spreading factor for a normal bandwidth carrier system scaled with a bandwidth scaling factor for a flexible bandwidth carrier system, and code configured to adapt the TPC step size with additional TPC command bits resulting from the reduced spreading factor. In some embodiments, the non-transitory computer-readable medium includes code configured to identify a source of TPC commands bits and code configured to adapt the TPC step size with additional TPC command bits resulting from the identified source of TPC commands. The additional TPC command bits may result in a TPC command in which one or more of most significant bits represent a major trend and one or more of least significant bits represent a minor trend.

In some embodiments, the non-transitory computer-readable medium includes code configured to determine a current metric with respect to a current TPC mechanism that supports adaptation of the TPC step size based on the identified at least one trend, code configured to compare the current metric to a reference metric with respect to a reference TPC mechanism, and code configured to adapt TPC operations based on the comparison. In some embodiments, the non-transitory computer-readable medium includes code configured to determine an ideal power with respect to the current TPC mechanism, code configured to determine a received power with respect to the current TPC mechanism, and code configured to calculate the current metric based on a time average of a difference between the received power and the ideal power.

In some embodiments, a method for transmit power control in a wireless communications system includes identifying in a first device, a TPC command sent from a second device, the identified TPC command being from a set of more than two TPC commands known by the first device and the second device, and each TPC command in the set of more than two TPC commands being mapped to an up or down command with a unique step size, and adjusting a transmit power of the first device based on the identified TPC command. The number of TPC commands from the set of more than two TPC commands mapped to up commands may be the same as the number of TPC commands from the set of more than two TPC commands mapped to down commands. The difference in the unique step size between any two up commands or any two down commands may be a constant.

In some embodiments, a wireless communications system includes means for identifying in a first device, a TPC command sent from a second device, the identified TPC command being from a set of more than two TPC commands known by the first device and the second device, and each TPC command in the set of more than two TPC commands being mapped to an up or down command with a unique step size, and means for adjusting a transmit power of the first device based on the identified TPC command.

In some embodiments, a wireless communications device includes at least one processor communicatively coupled with a memory, the memory having executable code that, when executed by the at least one processor, causes the at least one processor to identify in a first device, a TPC command sent from a second device, the identified TPC command being from a set of more than two TPC commands known by the first device and the second device, and each TPC command in the set of more than two TPC commands being mapped to an up or down command with a unique step size, and to adjust a transmit power of the first device based on the identified TPC command.

In some embodiments, a computer program product for transmit power control in a wireless communications system includes a non-transitory computer-readable medium having code configured to identify in a first device, a TPC command sent from a second device, the identified TPC command being from a set of more than two TPC commands known by the first device and the second device, and each TPC command in the set of more than two TPC commands being mapped to an up or down command with a unique step size, and code configured to adjust a transmit power of the first device based on the identified TPC command.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A shows a block diagram of a frame in accordance with various embodiments;

FIG. 4B shows a block diagram of a reduced rate frame in accordance with various embodiments;

FIG. 7 shows a table illustrating TPC command settings for up trend catch up and down trend catch up in accordance with various embodiments;

FIG. 10A shows a table illustrating TPC command settings for major trends and minor trends in accordance with various embodiments;

FIG. 10B shows a table illustrating an example of TPC command settings for a particular sequence of TPC commands in accordance with various embodiments;

FIG. 10C shows a table illustrating another example of TPC command settings for the particular sequence of TPC commands in accordance with various embodiments;

FIG. 10D shows a table illustrating another example of TPC command settings for the particular sequence of TPC commands in accordance with various embodiments;

FIG. 10E shows a table illustrating yet another example of TPC command settings for the particular sequence of TPC commands in accordance with various embodiments;

FIG. 12A shows a table illustrating TPC command settings for increased TPC command bits in accordance with various embodiments;

FIG. 12B shows a table illustrating TPC command settings for increased TPC command bits in accordance with various embodiments;

FIG. 14 shows a table illustrating TPC command settings for multiple TPC up and down commands mapped to different step sizes in accordance with various embodiments;

DETAILED DESCRIPTION

Figure 1:
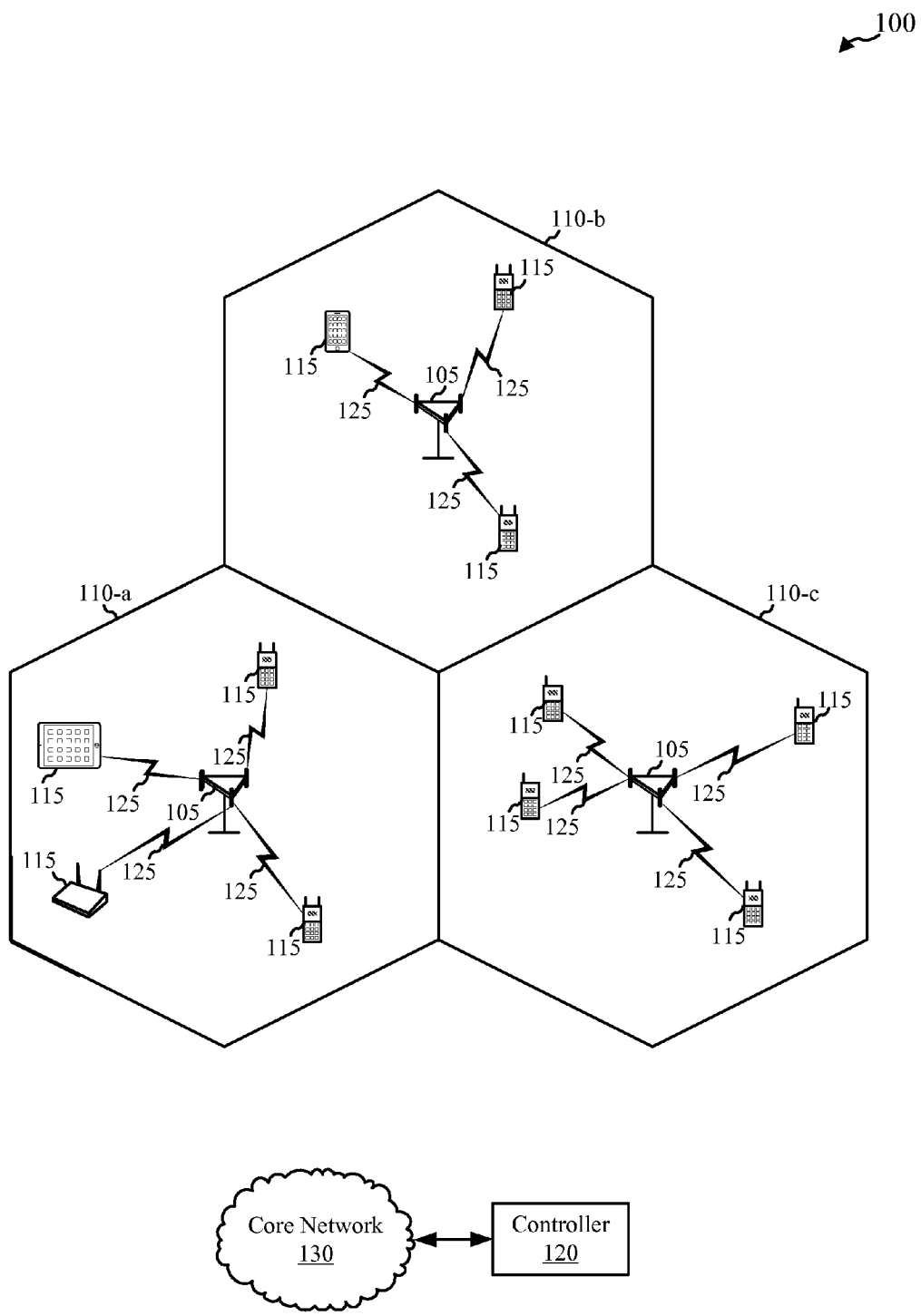
FIG. 1 shows a block diagram of a wireless communications system in accordance with various embodiments.

Methods, systems, and devices are provided that may address issues relating to effective transmit power control of a communications device in a wireless communications system. Some embodiments utilize techniques with dynamically adaptive steps sizes for transmit power control based on one or more trends. These adaptive step size techniques need not involve changes to certain existing TPC mechanisms (e.g., algorithms or specification), but may involve the assignment or mapping of different step sizes to TPC commands. For example, some techniques may identify a trend in the TPC commands and may adapt a TPC step size as a result.

Other embodiments utilize techniques that provide transmit power control based on multiple interference estimates in a frame slot. Utilizing multiple interference estimates at sub-slot intervals may provide additional transmit power control by allowing more transmit power adjustments, or more appropriate adjustments, for each slot. These techniques may be applied to a standard TPC rate, such as 1500 Hz, which may involve changes to the specification and implementation. These techniques may also be applied to reduced TPC rates, such as 1500 Hz/N, where N is a bandwidth scaling factor. Utilizing these techniques with reduced TPC rates need not involve changes to existing algorithms or specifications but may involve the assignment or mapping of different step sizes to TPC commands, similar to adaptive step size techniques.

Some embodiments utilize normal bandwidth carrier system such as a Universal Mobile Telecommunication System (UMTS) and/or flexible bandwidth carrier systems such as a flexible UMTS (F-UMTS). Flexible bandwidth carrier systems may involve wireless communications systems that utilize portions of spectrum that may not be big enough to fit a normal waveform utilizing flexible waveforms. A flexible bandwidth carrier system may be generated with respect to a normal carrier bandwidth system through dilating, or scaling down, the time or the chip rate of the flexible bandwidth carrier system with respect to the normal carrier bandwidth system. Some embodiments increase the bandwidth of a flexible waveform through expanding, or scaling up, the time or the chip rate of the flexible carrier bandwidth system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, mobile device, access terminal, subscriber unit, or user equipment. The user equipment 115 may include cellular phones and wireless communications devices, but may also include personal digital assistants (PDAs), smartphones, other handheld devices, netbooks, notebook computers, or the like. Thus, the term user equipment should be interpreted broadly hereinafter, including the claims, to include any type of wireless or mobile communications device.

The base stations 105 may wirelessly communicate with the user equipment 115 via a base station antenna. The base stations 105 may be configured to communicate with the user equipment 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize normal bandwidth and waveforms and/or flexible bandwidth and waveforms in accordance with various embodiments. System 100, for example, shows transmissions 125 between user equipment 115 and base stations 105. The transmissions 125 may include uplink (UL) and/or reverse link or downlink (DL) transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates and/or bandwidth scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115 and/or base stations 105) through dilating, or scaling down, the time of the flexible subsystem with respect to the time of the normal subsystem.

In some embodiments, the different aspects of system 100, such as the user equipment 115 and the base stations 105 are configured for transmit power control by identifying at least one trend with respect to two or more TPC commands and adapting a TPC step size based on the identified at least one trend. In some embodiments, a reduced TPC rate is identified and the identified reduced TPC rate may be compensated through the adapted TPC step size. In some embodiments, identifying the at least one trend includes identifying a major trend, identifying a minor trend, and adapting the TPC step size based on at least the identified major trend or the identified minor trend. A major trend may refer to changes in the TPC step size over multiple steps that may generally be increases in the TPC step size or generally decreases in the TPC step size. A major trend may be implemented by using a parameter that defines the size of the TPC steps. A minor trend may refer to changes in the TPC step size within a major trend. A minor trend may be implemented by using another parameter to define the size of the TPC steps. In some embodiments, the major trend parameter is larger than the minor trend parameter. Alternatively, the minor trend parameter may be larger than the major trend parameter. In some embodiments, identifying the at least one trend includes identifying that a same TPC command has been utilized two or more consecutive times. In some embodiments, a reduced spreading factor is identified and the TPC step size is adapted by using additional TPC command bits resulting from the reduced spreading factor. The additional TPC command bits may result in a TPC command in which one or more of the most significant bits represent a major trend and one or more of the least significant bits represent a minor trend. In some embodiments, a source of TPC command bits is identified and the TPC step size is adapted with additional TPC command bits resulting from the identified source of TPC command bits. An example of another source of TPC command bits is to utilize an additional code.

In some embodiments, different aspects of system 100, such as the user equipment 115 and the base stations 105 are configured for transmit power control by determining a plurality of interference estimates for a slot and utilizing the plurality of interference estimates to make one or more TPC adjustments for the slot. The interference estimates may include at least one signal-to-interference ratio (SIR) estimate. In some embodiments, a reduced TPC rate is identified and the identified reduced TPC rate is utilized to make the one or more TPC adjustments. In some embodiments, utilizing the plurality of interference estimates includes transmitting multiple independent TPC commands for the slot where each independent TPC command is based on one ore more of the interference estimates. In some embodiments, utilizing the plurality of interference estimates includes adjusting a transmit power multiple times, each adjustment corresponding to an independent TPC command that is based on one of the interference estimates. In some embodiments, utilizing the plurality of interference estimates includes adjusting a TPC step size based on the interference estimates. In some embodiments, a spreading factor is reduced by a bandwidth scaling factor for a flexible bandwidth carrier system and two or more TPC commands are conveyed based on an increased number of TPC command bits resulting from the reduced spreading factor. In some embodiments, an additional code is identified and two or more TPC commands are conveyed based on an increased number of TPC command bits resulting from the identification of the additional code.

In some embodiments, the different aspects of system 100, such as the user equipment 115 and the base stations 105 are configured for determining and utilizing various metrics related to transmit power control. In some embodiments, a current metric is determined with respect to a current TPC mechanism or technique. The current metric is then compared to a reference metric with respect to a reference TPC mechanism or technique and the TPC operations are adapted based on the comparison. In some embodiments, the current metric and the reference metric are calculated using a rise-over-normal (RoN) technique, in which the metric is calculated based on a time average of the difference between a received power and an ideal power. In some embodiments, adapting the TPC operations includes selecting one of the current TPC mechanism and the reference TPC mechanism to perform the TPC operations. Rise-over-normal may represent an increase in a typical or expected metric when a different TPC mechanism or a different step size is applied to UMTS or F-UMTS.

Some embodiments may include user equipment and/or base stations that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a bandwidth scaling factor. Other embodiments may generate a flexible waveform to fit a portion of spectrum through altering a rate or chip rate (e.g., a spreading factor may change). Some embodiments may change a frequency of processing to change a chip rate or utilize a bandwidth scaling factor. Changing frequency of processing may include changing an interpolation rate, an interrupt rate, and/or a decimation rate. In some embodiments, a chip rate may be changed or a bandwidth scaling factor utilized through filtering, by decimation, and/or by changing a frequency of an analog-to-digital converter (ADC), a digital-to-analog converter (DAC), and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
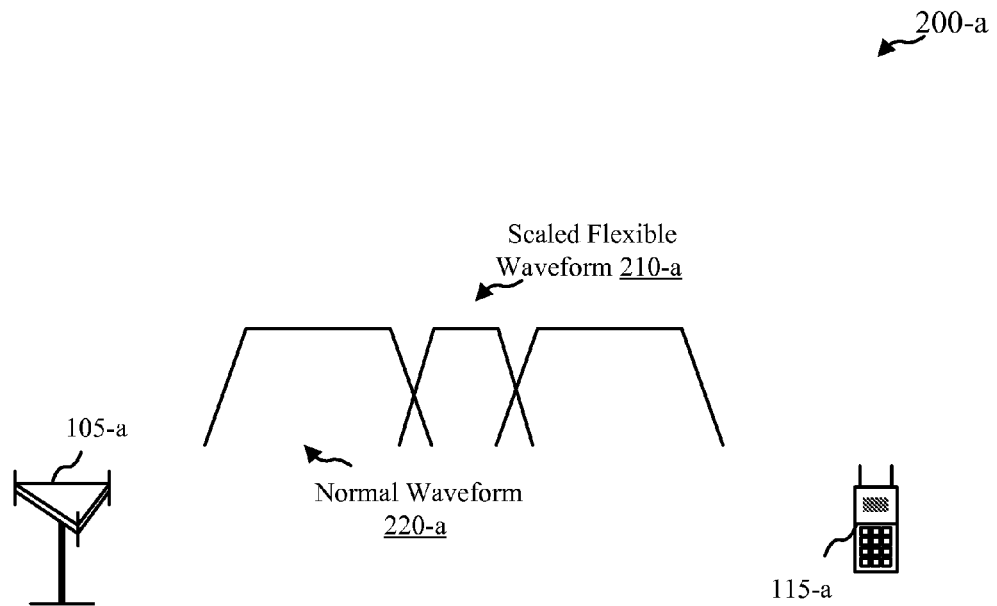
FIG. 2A shows an example of a wireless communications system where a flexible waveform fits into a portion of spectrum not broad enough to fit a normal waveform in accordance with various embodiments.

FIG. 2A shows an example of a wireless communications system 200-a with a base station 105-a and a user equipment 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a, where the normal waveform 220-a may be transmitted either by the base station 105-a and/or the user equipment 115-a. In some cases, the normal waveform 220-a may completely overlap the flexible waveform 210-a. Some embodiments may also utilize multiple flexible waveforms 210. In some embodiments, another base station and/or user equipment (not shown) may transmit the normal waveform 220-a and/or the flexible waveform 210-a.

The amount of power used by the user equipment 115-a to transmit to the base station 105-a may be controlled by the base station 105-a by sending one or more TPC commands to the user equipment 115-a in accordance with various embodiments. Similarly, the amount of power used by the base station 105-a to transmit to the user equipment 115-a may be controlled by the user equipment 115-a by sending one or more TPC commands to the base station 105-a in accordance with various embodiments.

Figure 2B:
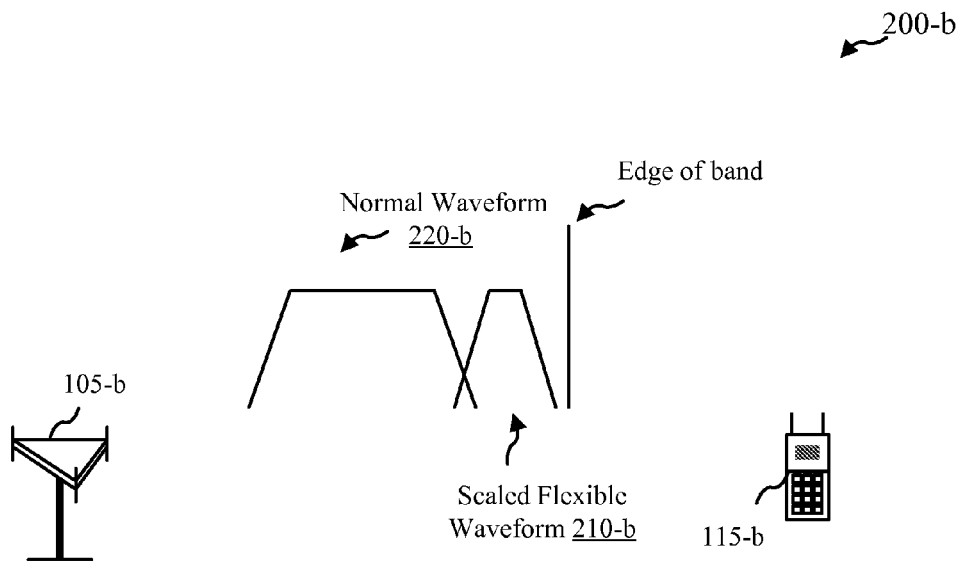
FIG. 2B shows an example of a wireless communications system where a flexible waveform fits into a portion of spectrum near an edge of a band in accordance with various embodiments.

FIG. 2B shows an example of a wireless communications system 200-b with a base station 105-b and user equipment 115-b, where a flexible waveform 210-b fits into a portion of spectrum near an edge of a band, which may be a guard band, where a normal waveform such as the normal waveform 220-b may not fit. System 200-b may be an example of system 100 of FIG. 1. Similar techniques for supporting voice services utilizing scaled flexible waveform 210-b may be applicable as discussed above. Moreover, like the example shown in FIG. 2A, the amount of transmit power used by the base station 105-b and/or by the user equipment 115-b may be controlled by sending one or more TPC commands from one device to the other in accordance with various embodiments.

Figure 3:
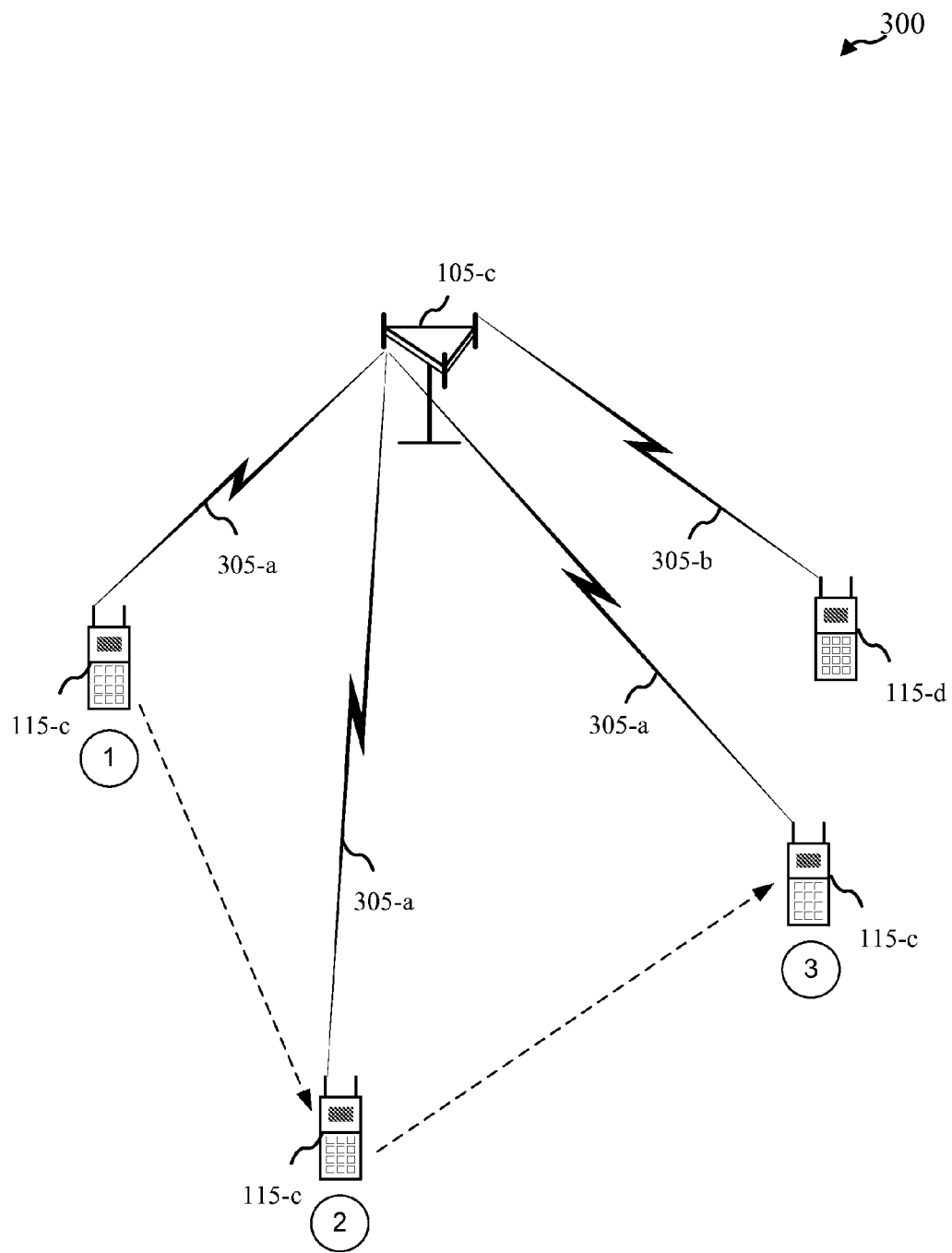
FIG. 3 shows a block diagram of a wireless communications system in accordance with various embodiments.

FIG. 3 shows a wireless communications system 300 with a base station 105-c and user equipment 115-c and 115-d, in accordance with various embodiments. In some embodiments, the base station 105-c and/or the user equipment 115-c/115-d are configured for providing services, such as voice services, within a flexible bandwidth carrier system. For example, transmissions 305-a and/or 305-b between the user equipment 115-c/115-d and the base station 105-c may involve transmissions that have been scaled utilizing flexible waveforms. In some embodiments, transmissions 305-a and/or 305-b occur at reduced rates from techniques other than scaling utilizing flexible waveforms.

During communication between the user equipment 115-c and the base station 105c, the user equipment 115-c may be in motion. The amount of power that is needed by the user equipment 115-c to transmit to the base station 105-c may be less when the user equipment 115-c is in location 1 than when the user equipment 115-c is in locations 2 and 3 because location 1 is closest to the base station 105-c. Accordingly, as the user equipment 115-c moves within the region of coverage of the base station 105-c, the amount of transmit power from the user equipment 115-c to the base station 105-c may need to be controlled to maintain good communication between the two. Other reasons, such as channel quality and/or interference, for example, may also affect communication between the user equipment 115-c and the base station 105-c.

In the scenario illustrated in FIG. 3, when the base station 105-c detects a drop in signal strength from the user equipment 115-c, or an increase in noise or interference, the base station 105-c may instruct the user equipment 115-c to increase its transmit power. The drop in signal strength or the increase in noise or interference may be the result of the user equipment 115-c moving away from the base station 105-c (e.g., location 2) or the presence of nearby devices (e.g., location 3 and the user equipment 115-d) causing the interference, for example. The instructions to increase the transmit power are provided to the user equipment 115-c by way of one or more TPC commands sent from the base station 105-c via a downlink in the transmissions 305-a.

On the other hand, when the base station 105-c detects an increase in signal strength from the user equipment 115-c, or an decrease in noise or interference, the base station 105-c may instruct the user equipment 115-c to decrease its transmit power. The increase in signal strength or the decrease in noise or interference may be the result of the user equipment 115-c moving closer to the base station 105-c or the absence of nearby devices causing interference, for example. A decrease in the transmit power may not only conserve power at the user equipment 115-c but may also reduce the amount of interference that the user equipment 115-c may be caused on other devices. The instructions to decrease the transmit power are provided to the user equipment 115-c by way of one or more TPC commands sent from the base station 105-c via a downlink in the transmissions 305-a.

Sometimes, for typical TPC commands having a fixed step size, the rate at which the TPC commands are sent is not sufficient to make the proper adjustments in the transmit power. When communication conditions change faster than the rate at which adjustment to the transmit power may be provided, it may be a challenge to bring the transmit power close to what is actually desired. However, merely increasing the rate at which TPC commands are sent may not address this issue. That is because it is the slope at which power can change that determines the effectiveness of the transmit power adjustment process. The slope at which power can change is based on both the TPC command step size and the update rate. By simply changing one or the other the transmit power adjustment may not be optimized. For example, increasing the fixed step size of the TPC command may increase the slope but may also add more variance in a steady state environment. On the other hand, increasing the update rate may reduce the power available for data (e.g., reduce the data) or may increase the error rate of the TPC commands (e.g., when the power used for power control is not adjusted).

In some embodiments, the base station 105-c and the user equipment 115-c and 115-d are configured to facilitate more effective and rapid transmit power control by having the base station 105-c identify at least one trend with respect to two or more TPC commands and then adapt a TPC step size utilized by the user equipment 115-c and 115-d based on the identified at least one trend. The base station 105-c may identify a major trend and a minor trend and the TPC step size may be adapted based on at least the identified major trend or the identified minor trend. The at least one trend may include having the same TPC command utilized two or more consecutive times. In some embodiments, the at least one trend may be identified by certain sequences of consecutive TPC commands and not just by having the same TPC command utilized two or more consecutive times. In some embodiments, the base station 105-c identifies a reduced spreading factor and the TPC step size is adapted by utilizing the additional TPC command bits resulting from the reduced spreading factor. In some embodiments, the base station 105-c identifies a reduced TPC rate and the identified reduced TPC rate is compensated through the adapted TPC step size. The reduced spreading factor and/or the reduced TPC rate may result from the use of flexible waveforms in the transmissions 305-a and 305-b between the base station 105c and the user equipment 115-c and 115-d, respectively.

In some embodiments, the base station 105-c and the user equipment 115-c and 115-d are configured to facilitate more effective and rapid transmit power control by having the base station 105-c determine a plurality of interference estimates (e.g., SIR estimates) for a slot and utilize interference estimates to make one or more TPC adjustments for the slot. The base station 105-c may transmit an independent TPC command for each interference estimate. The base station 105-c may adjust a transmit power multiple times, each adjustment corresponding to an independent TPC command that is based on one of the interference estimates. The base station 105-c may adjust a TPC step size based on the interference estimates. These adjustments may be carried out by the user equipment 115-c and 115-d based on TPC commands provided by the base station 105-c. In some embodiments, the base station 105-c reduces a spreading factor and two or more TPC commands are conveyed based on an increased number of TPC command bits resulting from the reduced spreading factor. In some embodiments, the base station 105-c identifies a reduced TPC rate and the identified reduced TPC rate is utilized to make the one or more TPC adjustments. The reduced spreading factor and/or the reduced TPC rate may result from the use of flexible waveforms in the transmissions 305-a and 305-b between the base station 105-c and the user equipment 115-c and 115-d, respectively.

In some embodiments, the base station 105c and the user equipment 115-c and 115-d are configured to facilitate more effective and rapid transmit power control by having the base station 105-c determine and utilize various metrics related to transmit power control. In some embodiments, the base station 105-c determines a current metric with respect to a current TPC mechanism. The base station 105-c may compare the current metric to a reference metric with respect to a reference TPC mechanism and the TPC operations between the base station 105-c and the user equipment 115-c or 115-d may be adapted based on the comparison. In some embodiments, the current metric and the reference metric are calculated using a RoN technique. In some embodiments, adapting the TPC operations includes having the base station 105-c select one of the current TPC mechanism and the reference TPC mechanism to perform the TPC operations.

While FIG. 3 illustrates a scenario in which the base station 105-c may control the transmit power of the user equipment 115-c and 115-d, the same or similar transmit power control concepts may be applied to a scenario in which the user equipment 115-c or the user equipment 115-d, or both, control the transmit power of the base station 105-c.

Transmissions 305-a and/or 305-b between the user equipment 115-c/115-d and the base station 105-c may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a bandwidth scaling factor N with respect to a normal waveform. Bandwidth scaling factor N may take on numerous different values including, but not limited to, integer values such as 1, 2, 4, etc. N, however, does not have to be an integer.

Some embodiments may utilize additional terminology. A new unit D may be utilized. The unit D is dilated. The unit is unitless and has the value of N. One can talk about time in the flexible system in terms of "dilated time." For example, a slot of say 10 milliseconds (ms) in normal time may be represented as 10 Dms in flexible time (note: even in normal time, this will hold true since N=1 in normal time; that is, D has a value of 1 in normal time, so 10 Dms=10 ms). In time scaling, one can replace most "seconds" with "dilated-seconds." Note frequency in Hertz is 1/s. Some embodiments may also utilize a chip rate divider ("Dcr"), which may also have the value N.

As discussed above, a flexible waveform may be a waveform that occupies less bandwidth than a normal waveform. Thus, in a flexible bandwidth carrier system, the same number of symbols and bits may be transmitted over a longer duration compared to a normal bandwidth carrier system. This may result in time stretching, whereby slot duration, frame duration, etc., may increase by a bandwidth scaling factor N. Bandwidth scaling factor N may represent the ratio of the normal bandwidth to flexible bandwidth (BW). Thus, data rate in a flexible bandwidth carrier system may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a bandwidth scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a bandwidth scaling factor that may be not equal to one (e.g., N=2, 4, 8, ½, ¼, etc.). For N>1, or if a chip rate is decreased, the bandwidth of a waveform may decrease. Some embodiments may utilize bandwidth scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Turning next to FIG. 4A, a block diagram illustrates a frame 400 with multiple slots. The frame 400 may correspond to a frame for a normal bandwidth carrier system (e.g., UMTS). For UMTS, for example, the frame 400 may include 15 slots (slot 0, . . . , slot 14). Each slot may have a corresponding TPC command represented by a number of TPC command bits. Typically, two (2) bits have been used for each TPC command. FIG. 4B illustrates a frame 400-a that is a time-dilated version of the frame 400 in FIG. 4A such that the duration of frame 400-a is increased compared to the duration of the frame 400. In this instance, the time dilation is based on N=2. The frame 400-a may correspond to a frame for a flexible bandwidth carrier system (e.g., F-UMTS). The time dilation may result in the frame 400-a and its slots being longer in duration than the frame 400 and its slots. Because of the increased slot duration in frame 400-a compared to the slot duration in frame 400, the rate at which the TPC commands are sent (i.e., the TPC rate) for frame 400-a is reduced compared to the rate for frame 400. In other words, the TPC rate for a normal bandwidth carrier system (i.e., normal TPC rate) is typically higher than the TPC rate for a flexible bandwidth carrier system (i.e., reduced TPC rate).

Time dilation may also result in a reduction, by a bandwidth scaling factor (N), of a spreading factor for an uplink dedicated physical control channel (UL DPCCH) and for a downlink dedicated physical channel (DL DPCH). The reduced spreading factor may increase the number of TPC command bits in each slot by N. For example, for circuit-switched adaptive multi-rate applications, the scaling of the spreading factor result in the number of TPC command bits being increased proportionally to the scaling factor utilized. When N=2, for example, the number of TPC command bits in a slot is increased from two to four (4). By increasing the number of TPC command bits in a slot, additional TPC information may be sent for that particular slot. For example, by doubling the number of TPC command bits in a slot from two to four, a 2-bit TPC command may be sent twice to improve detection, two independent 2-bit TPC commands may be sent to increase the rate of TPC adjustments, or a 4-bit TPC command may be sent to convey more adjustment granularity.

Figure 5A:
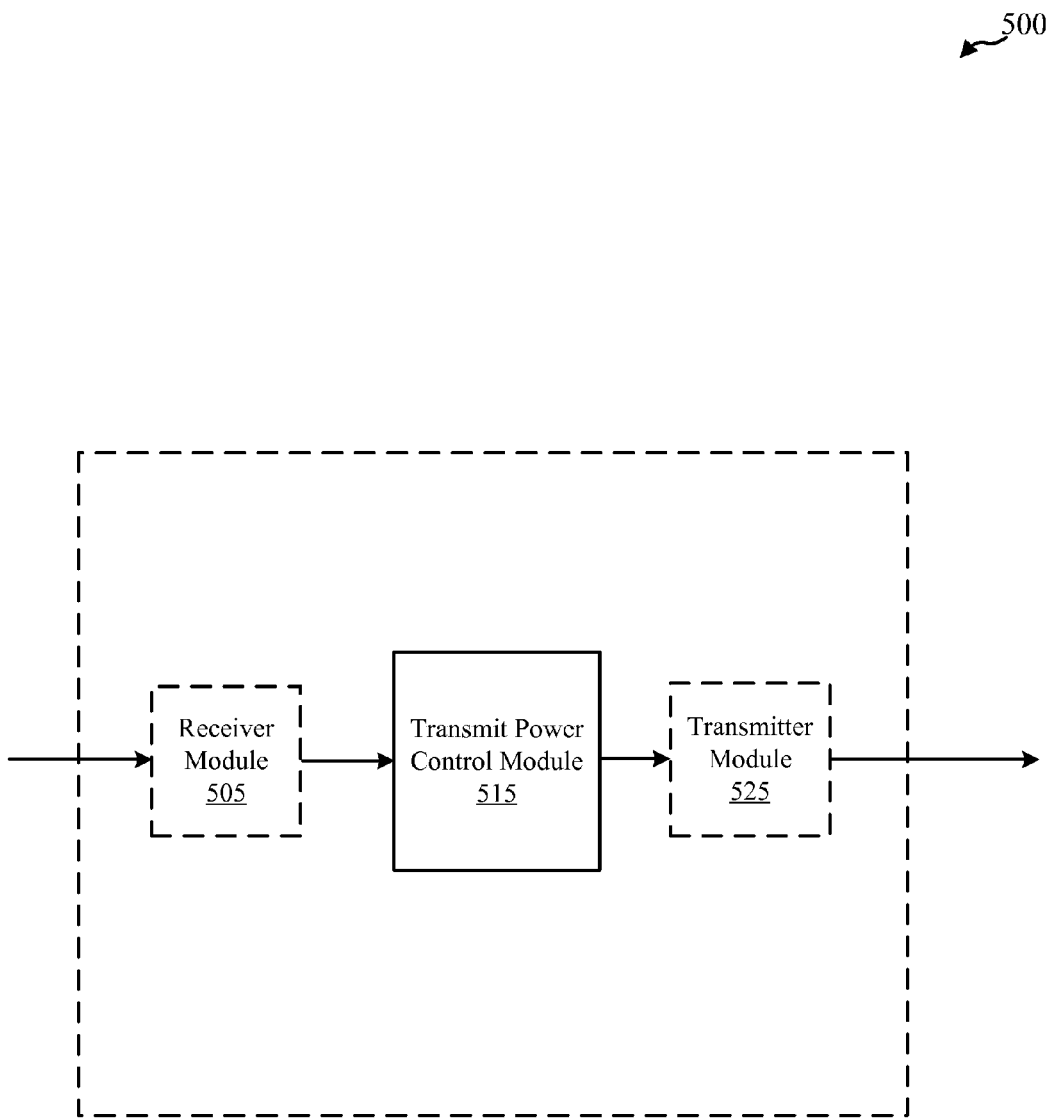
FIG. 5A shows a block diagram of a device configured for Transmit Power Control (TPC) operations in accordance with various embodiments.

Turning to FIG. 5A, a block diagram illustrates a device 500 for transmit power control in accordance with various embodiments. The device 500 may be an example of one or more aspects of user equipment 115 described with reference to FIG. 1, FIGS. 2A and 2B, FIG. 3, FIG. 17, and/or FIG. 18. The device 500 may also be an example of one or more aspects of base station 105 described with reference to FIG. 1, FIGS. 2A and 2B, FIG. 3, FIG. 16, and/or FIG. 18. The device 500 may also be a processor. The device 500 may include a receiver module 505, a transmit power control (TPC) module 515, and/or a transmitter module 525. Each of these components may be in communication with each other.

Device 500, through the receiver module 505, the TPC module 515, and/or the transmitter module 525, may be configured for transmit power control operations that are based on dynamically adapting TPC steps sizes based on trends. For example, the TPC module 515 may be configured to identify at least one trend with respect to two or more TPC commands and to adapt a TPC step size based on the identified at least one trend. In some embodiments, the TPC module 515 is configured to identify that a same TPC command has been utilized two or more consecutive times. In some embodiments, the TPC module 515 is configured to identify a major trend, to identify a minor trend, and to adapt the TPC step size based on at least the identified major trend or the identified minor trend. The identified major trend may indicate a first component of the TPC step size while the identified minor trend may indicate a second component of the TPC step size component smaller than the first component. In some embodiments, the TPC module 515 is configured to identify a reduced TPC rate and to compensate for the identified reduced TPC rate through the adapted TPC step size. The reduced TPC rate includes a normal TPC rate for a normal bandwidth carrier system scaled with a bandwidth scaling factor for a flexible bandwidth carrier system. In some embodiments, the TPC module 515 is configured to identify a reduced spreading factor and then adapt the TPC step size with additional TPC command bits resulting from the reduced spreading factor. The reduced spreading factor may include a normal spreading factor for a normal bandwidth carrier system scaled with a bandwidth scaling factor for a flexible bandwidth carrier system. Moreover, the additional TPC command bits may result in a TPC command in which one or more of the most significant bits represent a major trend and one or more of the least significant bits represent a minor trend.

Device 500, through the receiver module 505, the TPC module 515, and/or the transmitter module 525, may be configured for transmit power control operations that are based on multiple interference estimates for a slot. For example, the TPC module 515 may be configured to determine a plurality of interference estimates for a slot and then utilize the plurality of interference estimates to make one or more TPC adjustments for the slot. In some embodiments, the TPC module 515 and/or the transmitter module 525 are configured to transmit an independent TPC command for each of the interference estimates for the slot. In some embodiments, the TPC module 515 is configured to adjust a transmit power multiple times, where each adjustment corresponds to an independent TPC command based on one of the interference estimates for the slot. In some embodiments, the TPC module 515 is configured to adjust a TPC step size based on the interference estimates for the slot. In some embodiments, the TPC module 515 is configured to identify a reduced TPC rate and to utilize the reduced TPC rate to make the one or more TPC adjustments. The reduced TPC rate includes a normal TPC rate for a normal bandwidth carrier system scaled with a bandwidth scaling factor for a flexible bandwidth carrier system. In some embodiments, the TPC module 515 is configured to reduce a spreading factor for a flexible bandwidth carrier system and then convey two or more TPC commands for the slot based on the increased number of TPC command bits resulting from the reduced spreading factor and on the interference estimates for the slot.

Device 500, through the receiver module 505, the TPC module 515, and/or the transmitter module 525, may be configured for determining and utilizing various metrics related to transmit power control. For example, the TPC module 515 may be configured to determine a current metric with respect to a current TPC mechanism, compare the current metric to a reference metric with respect to a reference TPC mechanism, and adapt TPC operations based on the comparison. In some embodiments, the current TPC mechanism includes one of the techniques described herein for dynamically adapting TPC steps sizes based on trends. In some embodiments, the current TPC mechanism includes one of the techniques described herein for transmit power control operations based on multiple interference estimates for a slot. In some embodiments, the TPC module 515 is configured to perform a rise-over-normal analysis of the current TPC mechanism. The rise-over-normal analysis may include determining an ideal power with respect to the current TPC mechanism, determining a received power with respect to the current TPC mechanism, and calculating the current metric based on a time average of the difference between the received power and the ideal power. In some embodiments, the TPC module 515 is configured to select one of the current TPC mechanism and the reference TPC mechanism to perform the TPC operations. The reference TPC mechanism may refer to a typical or standard TPC implementation in which one TPC command is used per slot to increase or decrease the transmit power by 1 dB.

Figure 5B:
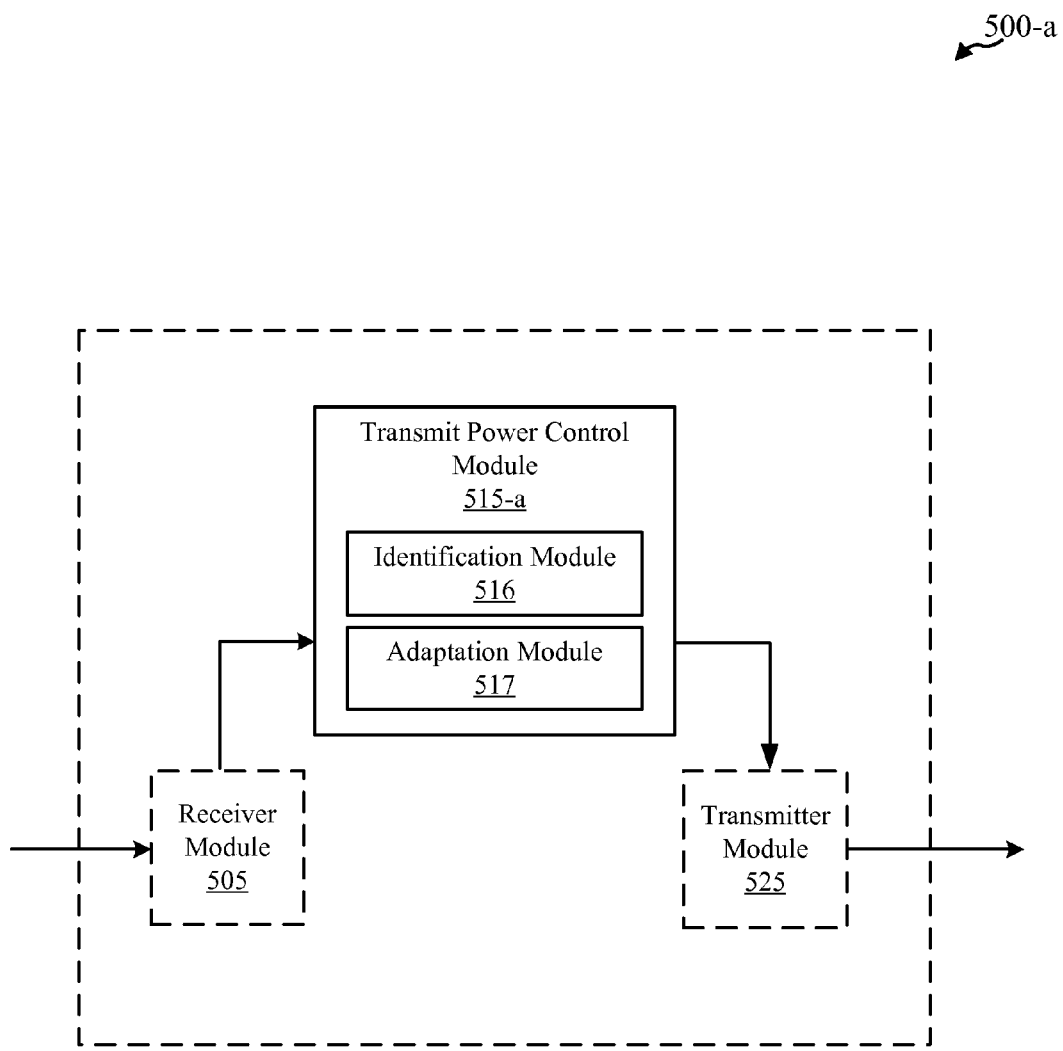
FIG. 5B shows a block diagram of a device configured for TPC operations in accordance with various embodiments.

Turning to FIG. 5B, a block diagram illustrates a device 500-a for transmit power control in accordance with various embodiments. The device 500-a may be an example of the device 500 in FIG. 5A. The device 500-a may also be a processor. The device 500-a may include the receiver module 505, a TPC module 515-a, and/or the transmitter module 525. Each of these components may be in communication with each other.

The TPC module 515-a may be an example of the TPC module 515 in FIG. 5A. The TPC module 515-a may include multiple modules to handle various aspects related to identifying at least one trend with respect to two or more TPC commands and adapting a TPC step size based on the identified at least one trend. An identification module 516 may be configured to identify trends, including major trends and minor trends. A trend may indicate when a TPC command has been used two or more consecutive times. The identification module 516 may be configured to identify a reduced TPC rate and/or a reduced spreading factor. An adaptation module 517 may be configured to adapt a TPC step size based on the identified at least one trend. In some embodiments, the adaptation module 517 is configured to compensate for the identified reduced TPC rate through the adapted TPC step size and/or to adapt the TPC step size with additional TPC command bits resulting from the identified reduced spreading factor.

Figure 5C:
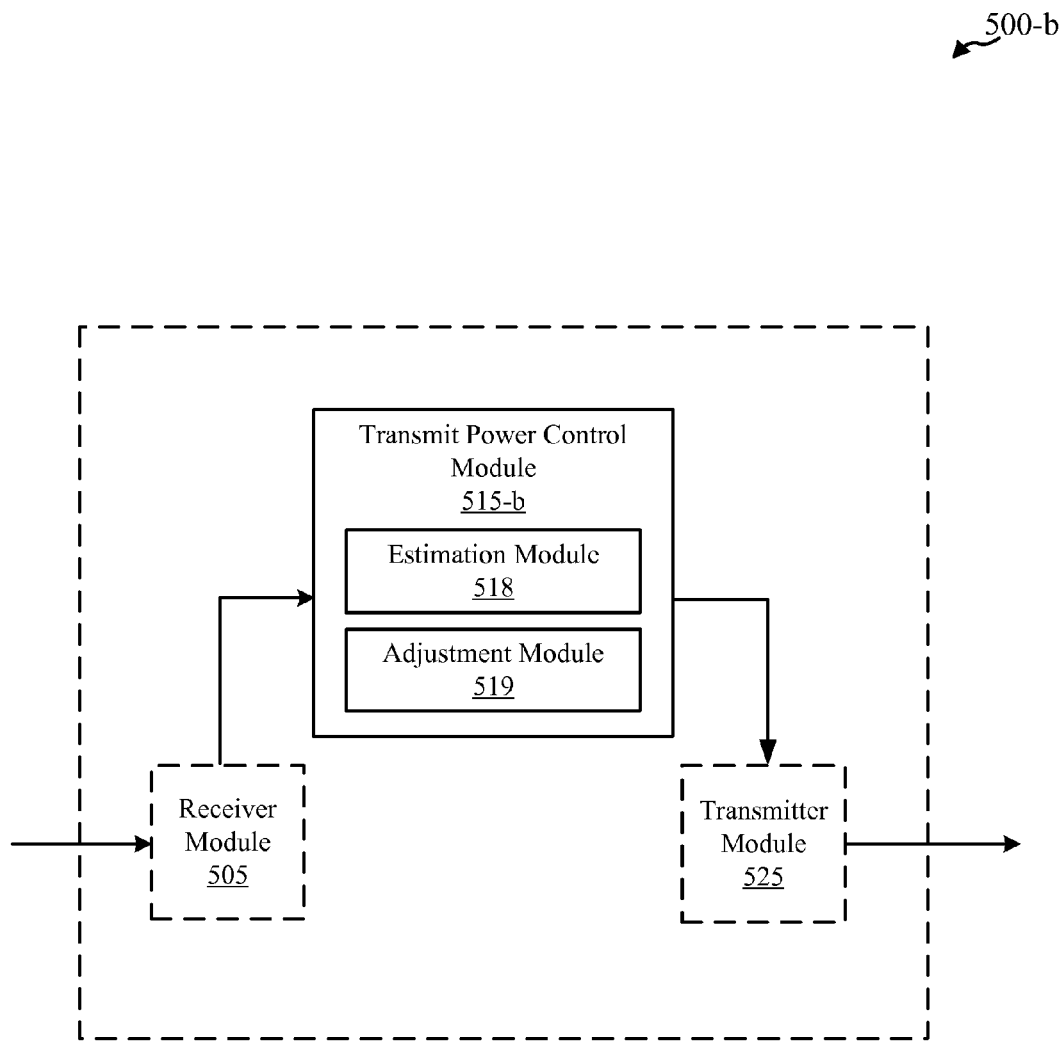
FIG. 5C shows a block diagram of a device configured for TPC operations in accordance with various embodiments.

Turning to FIG. 5C, a block diagram illustrates a device 500-b for transmit power control in accordance with various embodiments. The device 500-b may be an example of the device 500 in FIG. 5A. The device 500-b may also be a processor. The device 500-b may include the receiver module 505, a TPC module 515-b, and/or the transmitter module 525. Each of these components may be in communication with each other.

The TPC module 515-b may be an example of the TPC module 515 in FIG. 5A. The TPC module 515-b may include multiple modules to handle various aspects related to transmit power control operations that are based on multiple interference estimates for a slot. An estimation module 518 may be configured to determine a plurality of interference estimates for a slot. An adjustment module 519 may be configured to utilize the interference estimates to make one or more TPC adjustments for the slot. The adjustment module 519 may be configured to transmit an independent TPC command for each of interference estimates for the slot, to adjust a TPC step size based on the interference estimates for the slot, and/or adjust a transmit power multiple times, where each adjustment corresponds to an independent TPC command based on one of the interference estimates for the slot. In some embodiments, the adjustment module 519 is configured to identify a reduced TPC rate and utilize the reduced TPC rate to make the one or more TPC adjustments. In some embodiments, the adjustment module 519, and/or some other portion of the device 500-b, are configured to reduce a spreading factor by a bandwidth scaling factor for a flexible bandwidth carrier system, and convey two or more TPC commands for the slot based on the interference estimates for the slot and on an increased number of TPC command bits resulting from the reduced spreading factor.

Figure 5D:
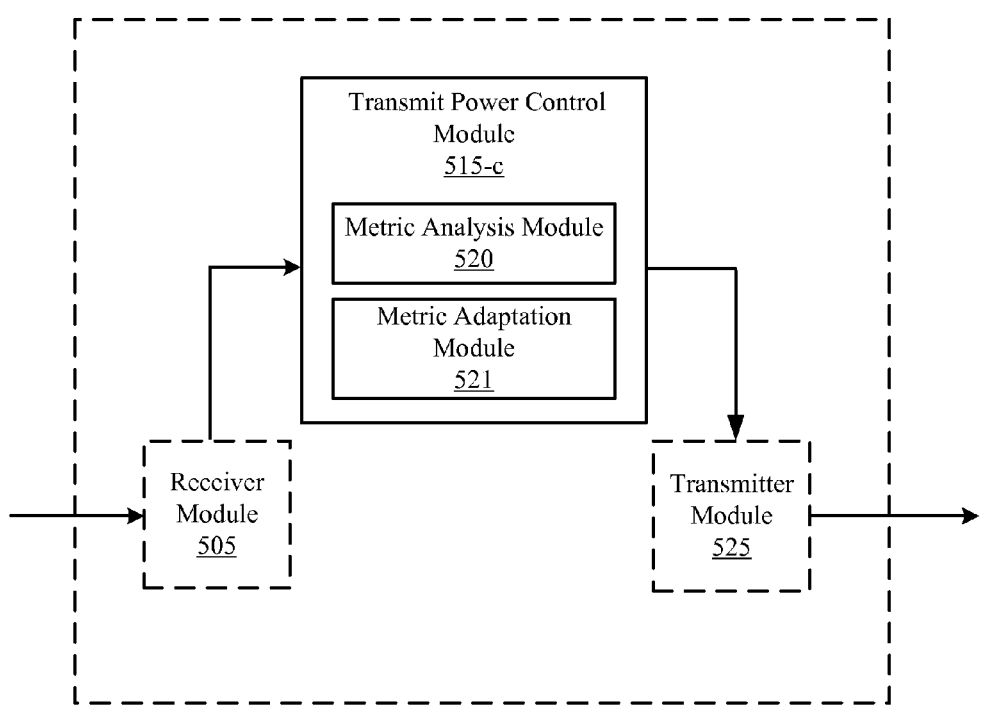
FIG. 5D shows a block diagram of a device configured for TPC operations in accordance with various embodiments.

Turning to FIG. 5D, a block diagram illustrates a device 500-c for transmit power control in accordance with various embodiments. The device 500-c may be an example of the device 500 in FIG. 5A. The device 500-c may also be a processor. The device 500-c may include the receiver module 505, a TPC module 515-c, and/or the transmitter module 525. Each of these components may be in communication with each other.

The TPC module 515-c may be an example of the TPC module 515 in FIG. 5A. The TPC module 515-c may include multiple modules to handle various aspects related to different techniques, including techniques for identifying at least one trend with respect to two or more TPC commands and adapting a TPC step size based on the identified at least one trend as well as techniques for transmit power control operations that are based on multiple interference estimates for a slot. A metrics analysis module 520 may be configured to perform metrics calculations for multiple TPC mechanisms or techniques. The metrics calculations may include rise-over-normal calculations such as determining a current metric with respect to a current TPC mechanism, and comparing the current metric to a reference metric with respect to a reference TPC mechanism. A metrics adaptation module 521 may be configured to adapt TPC operations based on the results from the metrics analysis module 520. For example, the metrics adaptation module 521 may adapt the TPC operations based on the comparison of the current metric with the reference metric. The metrics adaptation module 521 may be configured to select one of the current TPC mechanism and the reference TPC mechanism to perform the TPC operations. When multiple TPC mechanisms or techniques are analyzed by the metrics analysis module 520, the metrics adaptation module 521 may be configured to select one of the multiple TPC mechanisms analyzed and the reference TPC mechanism to perform the TPC operations.

The components of the devices 500, 500-a, 500-b, and 500-c in FIGS. 5A, 5B, 5C, and/or 5D may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 6:
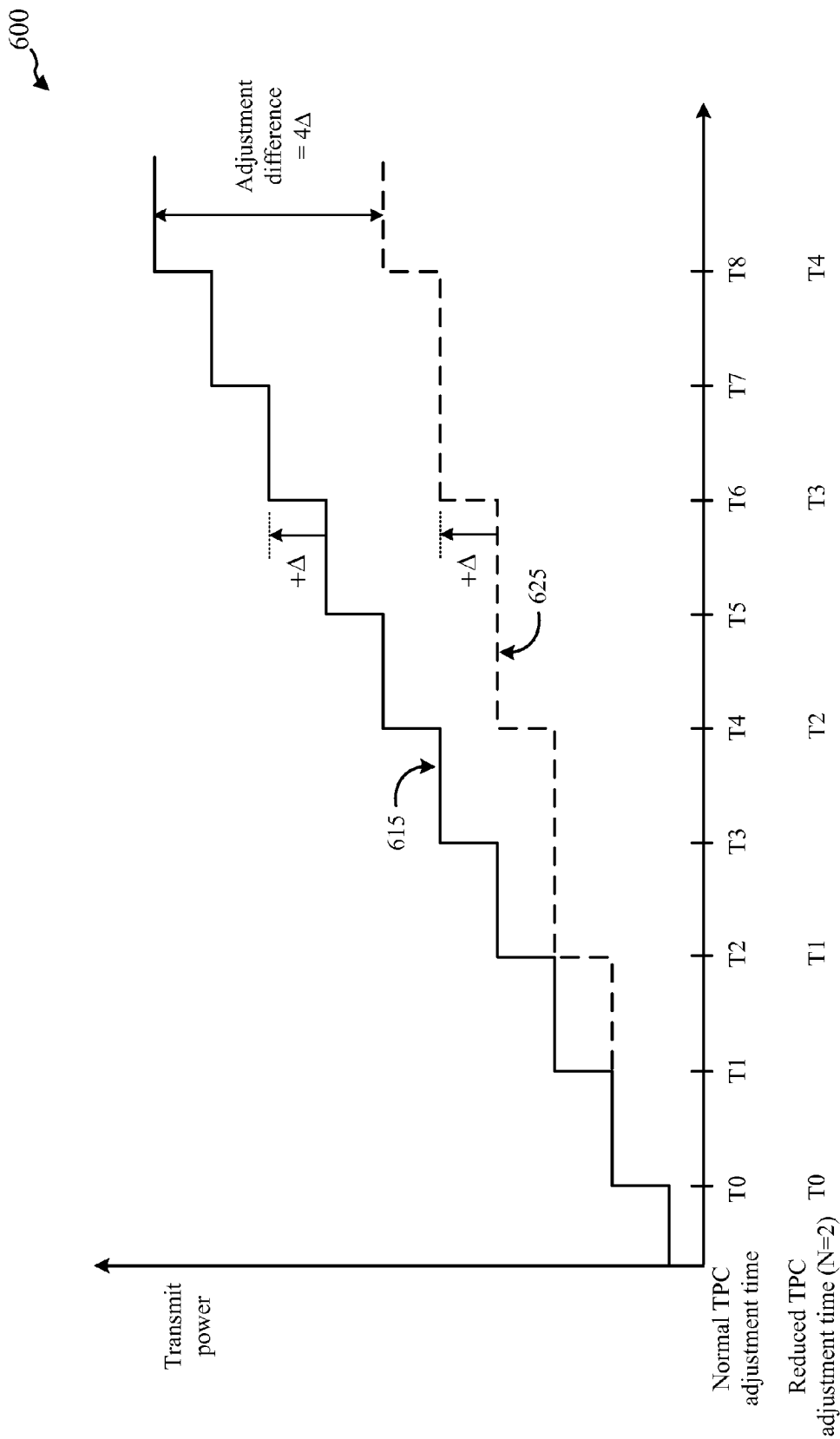
FIG. 6 provides an illustration of a transmit power control adjustment with a single TPC step size in accordance with various embodiments.

Turning to FIG. 6, a chart 600 is shown that illustrates issues that may arise in reduced TPC rate situations (N=2) when the transmit power is increased using a single TPC step size. In chart 600, a line 615 represents a series of consecutive increases in transmit power for a normal TPC adjustment timeline and a line 625 represents a series of consecutive increases in transmit power for a reduced TPC adjustment timeline. For the line 615, at a time T0 along the normal TPC adjustment timeline, a slot may provide a TPC command instructing an increase (+Δ) in transmit power. Similarly, at each of times T1, . . . , T8 in the normal TPC adjustment timeline, the corresponding slot provides a TPC command instructing an increase in the transmit power by the same amount, namely +Δ.

For the line 625, however, there are fewer time slots occurring in the same period of time as for line 615 because of the time dilation associated with the reduced TPC rate. In this case, at a time T0 along the reduced TPC adjustment timeline, a slot may provide a TPC command instructing an increase (+Δ) in transmit power. Then, at each of times T1, T2, T3, and T4 along the reduced TPC adjustment timeline, the corresponding slot provides a TPC command instructing an increase (+Δ) in transmit power. When the total increase in transmit power is compared after T8 for line 615 and after T4 for line 625, the final TPC adjustments provided in the reduced TPC adjustment timeline have fallen behind the final TPC adjustments provided in the normal TPC adjustment timeline by 4Δ.

The example shown in FIG. 6 illustrates that using a single TPC step size for reduced TPC rate situations may not allow for fast enough catch up with an up trend in transmit power. While the example illustrates the issue arising during multiple increases in transmit power, a similar issue may also arise during multiple reductions in transmit power. Changing the TPC step size to catch up more quickly may not be easy to implement. For example, in UMTS, the TPC step size may be changed by a Physical Channel Reconfiguration procedure. This may add signaling overhead, which may hurt capacity and may increase the call drop possibility.

Other TPC mechanisms or techniques are provided herein where trends in the TPC commands may be utilized by the user equipment, the base station, or the network to dynamically adjust the TPC step size. These techniques need not involve a change in a current TPC algorithm. Instead, they may change the interpretation or mapping of the TPC step size to a TPC command. These techniques may be applicable in different situations including, but not limited to flexible bandwidth carrier systems (e.g., F-UMTS). These techniques, however, may be sensitive to errors that may cause a trend to be missed or a trend to be identified when none was present.

In some embodiments, a TPC mechanism identifies a trend in a series of TPC commands based on having the same TPC command utilized two or more consecutive times. A trend parameter (M) may be set for a particular TPC mechanism as a threshold parameter to detect trends. For example, M may be dynamically set to identify when and/or how to adjust the TPC step size. In some embodiments, the value assigned to M may represent the number of times a TPC command may be utilized consecutively before an adjustment in the TPC step size is triggered. The value of M may also be utilized to scale the TPC step size when it is determined that an adjustment of the TPC step size is appropriate in view of a trend detected. For example, when the last M commands are all TPC up commands with step size of +Δ, the TPC step size may be adjusted to Δ'=M×(+Δ). The TPC step size may be reset to +Δ for the next command after the catch up step. Similarly, when the last M commands are all TPC down commands with step size −Δ, the TPC step size may be adjusted to Δ'=M×(−Δ) and reset to −Δ for the next command after the catch up step. The adjustment of the TPC step size need not be based on utilizing the value of M as a scaling factor. Instead, the adjustment of the TPC step size may be based on scaling that utilizes a parameter different than M, and/or based on adding or subtracting an offset or some other parameter to the TPC step size without utilizing that offset or parameter for scaling. If a trend is not identified, then the typical rules for transmit power control may apply. A new trend may be started once an old trend is broken (e.g., either because the TPC step size has been reset or because of lack of consecutive M up/down commands). The value of M, and/or of any parameter utilized to adjust the TPC step size, may be dynamically modified to adjust the effectiveness of the TPC mechanism.

In one example, for a TPC mechanism with M=3, after a TPC command with a certain step size (e.g., +Δ) is repeated three times in a row, a fourth consecutive occurrence of the TPC command may result in an adjustment of the step size (e.g., +2Δ) for that fourth occurrence. At the fifth consecutive occurrence of the TPC command, the step size of that fifth occurrence may revert back to the original step size (e.g., +Δ). In another example, for a TPC mechanism with M=3, after a TPC command with a certain step size (e.g., +Δ) is repeated twice in a row, a third consecutive occurrence of the TPC command may result in an adjustment of the step size (e.g., +2Δ) for that third occurrence, while a fourth consecutive occurrence of the TPC command may result in a different adjustment of the step size (e.g., +3Δ) for that fourth occurrence. At the fifth consecutive occurrence of the TPC command, the step size of that fifth occurrence may revert back to the original step size (e.g., +Δ). Similar approaches to those described above may be taken when consecutive TPC commands are in the same direction (e.g., consecutive TPC up commands or consecutive TPC down commands). For example, for a TPC mechanism with M=3, after three consecutive TPC up commands are identified, a fourth consecutive occurrence of a TPC up command may result in an adjustment of the step size for that fourth occurrence. At the fifth consecutive occurrence of a TPC up command, the step size of that fifth occurrence may not be adjusted and may be its typical value.

Turning next to FIG. 7, a table 700 illustrates an example of TPC command settings for up trend catch up and down trend catch up for a trend parameter M=2. According to table 700, for M=2, when a TPC down command represented by bit pair (00) is used at T0, the TPC step size is −Δ. When the TPC down command is repeated at T1, the TPC step size remains −Δ. However, when the TPC down command is repeated again at T2 and a trend of two consecutive TPC down commands is detected, the TPC step size is increased to $-2\Delta$. At T3, the TPC down command is repeated once again but the TPC step size is rest to $-\Delta$.

Similarly, when a TPC up command represented by bit pair (11) is used at T0, the TPC step size is $+\Delta$. When the TPC up command is repeated at T1, the TPC step size remains $+\Delta$. However, when the TPC up command is repeated again at T2 and a trend of two consecutive TPC up commands is detected, the TPC step size is increased to $+2\Delta$. At T3, the TPC up command is repeated once again but the TPC step size is rest to $+\Delta$. Resetting the TPC step size for both TPC down commands and TPC up commands may avoid overshooting when catching up with a down trend and an up trend, respectively.

Dynamically adjusting the TPC step size based on trends may be applicable when the user equipment 115 is not moving so fast that even catch up operations have little effect. For UMTS, for example, dynamic adjustment of the TPC step size may be applicable for speeds below 100-120 kilometers-per-hour (kmph). For F-UMTS, however, dynamic adjustment of the TPC step size may be applicable for speeds below 100-120 kmph but greater than 100-120 kmph divided by the bandwidth scaling factor N.

Figure 8:
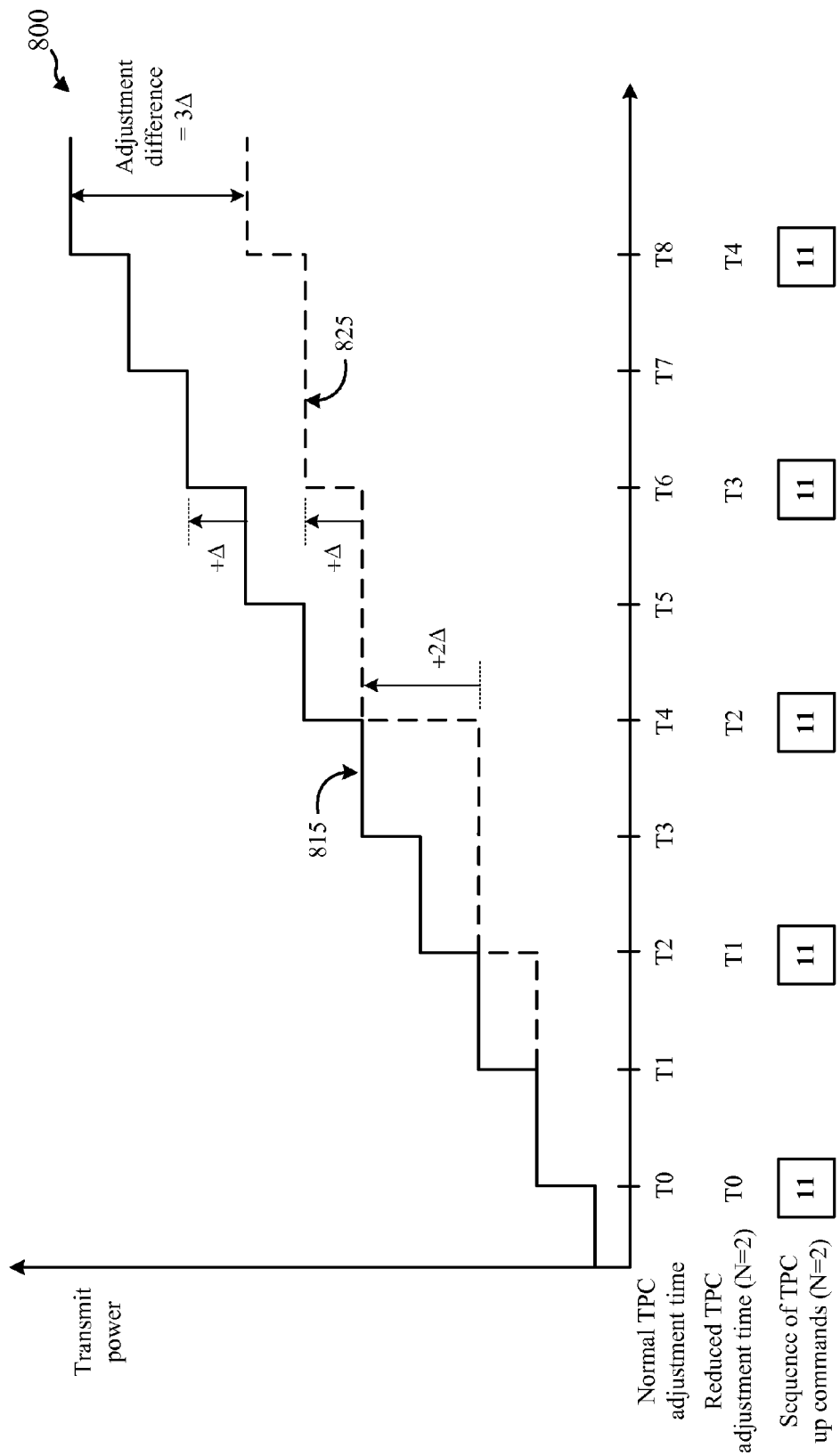
FIG. 8 provides an illustration of an up trend catch up in accordance with various embodiments.

Turning to FIG. 8, a chart 800 is shown that illustrates the use of the TPC command settings in table 700 for transmit power adjustments in reduced TPC rate situations (N=2) during an up trend catch up. In chart 800, a line 815 represents a series of consecutive increases in transmit power for a normal TPC adjustment timeline. The line 815 is substantially similar to the line 615 in FIG. 6. Chart 800 also includes a line 825 that represents a series of consecutive increases in transmit power for a reduced TPC adjustment timeline. The line 825 is different from the line 625 in FIG. 6 in that the TPC step size at T2 is $+2\Delta$ instead of $+\Delta$ as a result of a trend being detected with two consecutive TPC up commands at T0 and T1. As a result of this catch up step at T2, the final TPC adjustments provided in the reduced TPC adjustment timeline are behind the final TPC adjustments provided in the normal TPC adjustment timeline by $3\Delta$ instead of the $4\Delta$ shown in FIG. 6.

Figure 9:
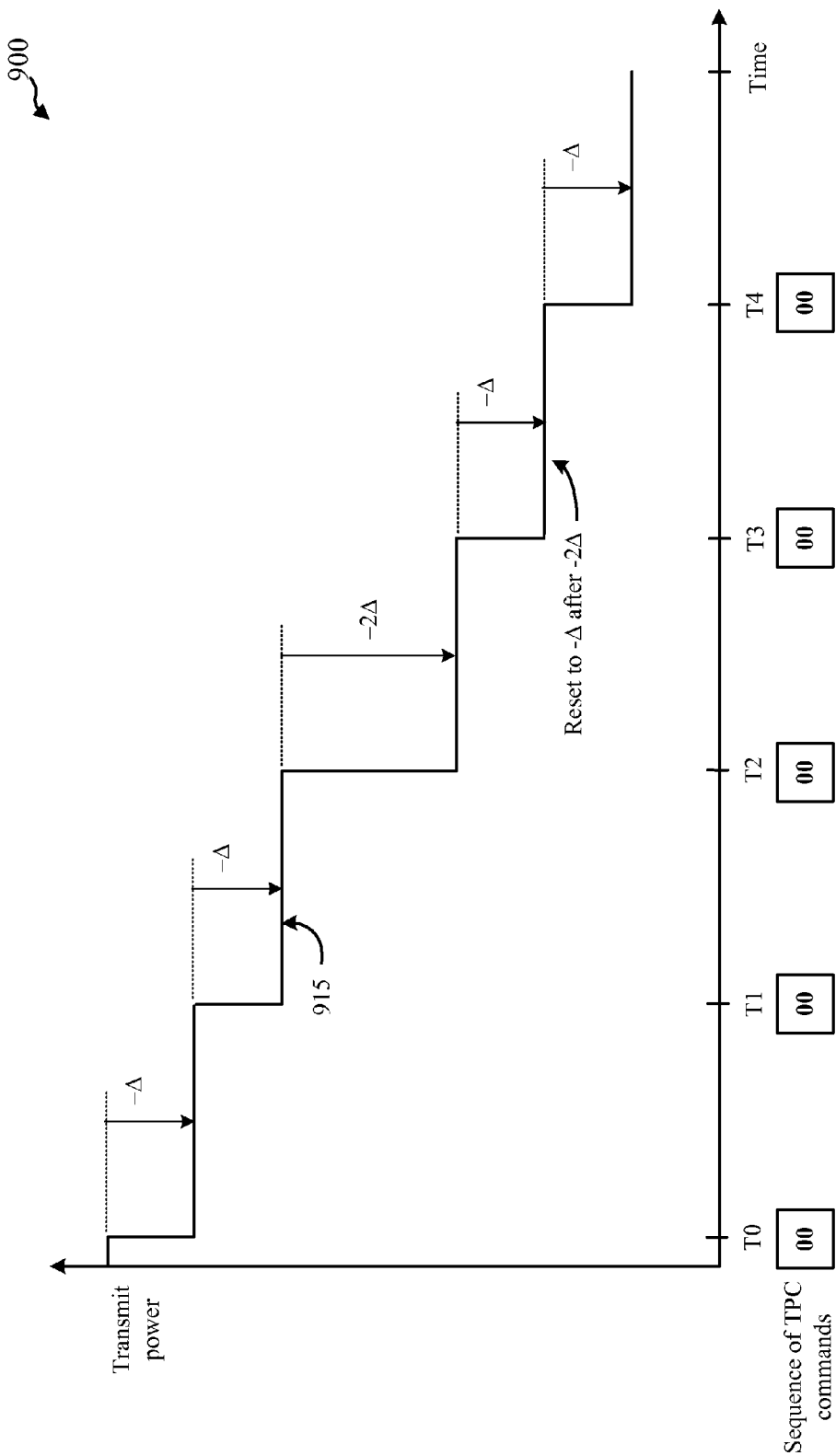
FIG. 9 provides an illustration of a down trend catch up in accordance with various embodiments.

Turning to FIG. 9, a chart 900 is shown that illustrates the use of the TPC command settings in table 700 for transmit power adjustments during a down trend catch up. In chart 900, a single line 915 is shown to represent a series of changes in transmit power based on a TPC command sequence. The TPC command sequence includes five consecutive TPC down commands at T0, T1, T2, T3, and T4. With respect to the consecutive TPC up commands, at T0 and T1 there are transmit power decreases of $-\Delta$ each. At T2, based on the trend of two consecutive TPC down commands at T0 and T1, the transmit power is decreased by $-2\Delta$. At T3, the transmit power decrease is reset to $-\Delta$. At T4, the transmit power again decreases by $-\Delta$ because a new trend of two consecutive TPC down commands has not been established after the reset at T3.

The examples in charts 800 and 900 are provided to illustrate catching up with an up trend and catching up with a down trend for cases when the catch up is determined based on M=2. The same or similar concepts may also apply to cases when the catch up is determined based on M>2. In an alternative embodiment, instead of resetting after $\Delta'=M(+\Delta)$ or after $\Delta'=M(-\Delta)$, the TPC step size is increased further if the trend continues until a threshold level is met, at which point the TPC step size is reset. Moreover, when a spreading factor results in additional TPC command bits (e.g., more than two TPC command bits per slot), the bits in the TPC up commands and in the TPC down commands may be repeated, which may help in detecting the appropriate TPC command and any existing trend.

When using trends to dynamically adapt a TPC step size, being able to catch up with a down trend may be more important in some situations than being able to catch up with an up trend. For example, during a down trend the transmit power is high and it is being reduced. A slower catch up to reduce the transmit power may result in the high transmit power interfering with other users. On the other hand, during an up trend the transmit power is low and it is being increased. A slower catch up to increase the transmit power may cause higher block error rate (BLER) for the user. The higher BLER in one device may be preferable in some situations than the complications arising from interfering with multiple devices. In other instances, however, being able to quickly respond to a down trend may be more important than responding to an up trend.

Turning next to FIG. 10A, a table 1000 illustrates an example of TPC command settings for major trends and minor trends. Generally, the bit pairs (00) and (11) are used to represent TPC up commands and TPC down commands, respectively, while the bit pairs (01) and (10) are not used for TPC commands at all. That is, bit pairs with repeated bits are typically used to represent TPC commands. Table 1000 shows all four bit pairs being utilized to add different biases based on the trend and to allow major and minor trends for a more effective transmit power control. A major trend may typically be represented by $\Delta$ and a minor trend may typically be represented by $\delta$.

In table 1000, when the bit pair (00) is utilized at T0, the TPC step size is $-\Delta$. When the bit pair (00) is repeated at T1, the TPC step size changes to $-\Delta-\delta$. When the bit pair (00) is repeated again at T2, the TPC step size changes to $-\Delta-2\delta$. When the bit pair (00) is repeated once again at T3, the TPC step size changes to $-\Delta-3\delta$. In this sequence, a major trend remains at $-\Delta$ while a minor trend includes 0, $-\delta$, $-2\delta$, and $-3\delta$.

A similar analysis of the bit pair (01) in table 1000 shows that for a sequence of four consecutive TPC commands represented by the bit pair (01), a major trend includes 0, $-\Delta$, $-\Delta$, and $-\Delta$, while a minor trend includes 0, $+\delta$, 0, and $-\delta$. For the bit pair (10), a sequence of four consecutive TPC commands represented by the bit pair (10) results in a major trend that includes 0, $+\Delta$, $+\Delta$, and $+\Delta$, and a minor trend includes 0, $-\delta$, 0, and $+\delta$. Finally, for the bit pair (11), a sequence of four consecutive TPC commands represented by the bit pair (11) results in a major trend that remains at $+\Delta$ while a minor trend includes 0, $+\delta$, $+2\delta$, and $+3\delta$.

Turning to FIG. 10B, a table 1000-a illustrates an example of TPC command settings for a particular sequence of TPC commands. The TPC command settings in table 1000-a are based on the TPC command settings in table 1000. The particular sequence of TPC commands in FIG. 10B includes having the bit pair (00) at T0, the bit pair (01) at T1, the bit pair (11) at T2, and the bit pair (00) at T3. The step sizes for this sequence are $-\Delta$ at T0, $-\Delta+\delta$ at T1, $+\Delta+2\delta$ at T2, and $-\Delta-3\delta$ at T3. These step sizes result from the TPC commands settings in table 1000. For example, when the bit pair (00) occurs at T0, the step size is $-\Delta$. When the bit pair (01) occurs at T1, the step size is $-\Delta+\delta$. When the bit pair (11) occurs at T2, the step size is $+\Delta+2\delta$. Finally, when the bit pair (00) occurs at T3, the step size is $-\Delta-3\delta$. The TPC mechanism need not determine the step size only from the time at which a particular TPC command occurs as illustrated below in FIG. 10C, FIG. 10D, and FIG. 10E.

Turning to FIG. 10B, a table 1000-a illustrates another example of TPC command settings for the particular sequence of TPC commands shown in table 1000 of FIG. 10A. In this example, the TPC mechanism may consider that the occurrence of the bit pair (01) at T1 is the first occurrence of the bit pair (01) in the TPC command sequence. From this perspective, the step size corresponding to the first occurrence of the bit pair (01) according to table 1000 is "No Change." Therefore, the step sizes for the particular sequence of TPC commands in this instance are $-\Delta$ at T0, "No Change" at T1, $+\Delta+2\delta$ at T2, and $-\Delta-3\delta$ at T3.

Turning to FIG. 10C, a table 1000-*b* illustrates another example of TPC command settings for the particular sequence of TPC commands shown in table 1000-*a* of FIG. 10A. In this example, the TPC mechanism may consider that the occurrence of the bit pair (11) at T2 is the first occurrence of the bit pair (11) in the TPC command sequence. From this perspective, the step size corresponding to the first occurrence of the bit pair (11) according to table 1000 is $+\Delta$. Therefore, the step sizes for the particular sequence of TPC commands in this instance are $-\Delta$ at T0, "No Change" at T1, $+\Delta$ at T2, and $-\Delta-3\delta$ at T3.

Turning to FIG. 10C, a table 1000-*c* illustrates yet another example of TPC command settings for the particular sequence of TPC commands shown in table 1000-*a* of FIG. 10A. In this example, the TPC mechanism may consider that the occurrence of the bit pair (00) at T3 is the second occurrence of the bit pair (00) in the TPC command sequence since there is a first occurrence of the bit pair (00) at T0. From this perspective, the step size corresponding to the second occurrence of the bit pair (00) according to table 1000 is $-\Delta-\delta$. Therefore, the step sizes for the particular sequence of TPC commands in this instance are $-\Delta$ at T0, "No Change" at T1, $+\Delta$ at T2, and $-\Delta-\delta$ at T3.

The examples described with reference to FIG. 10B, FIG. 10C, FIG. 10D, and FIG. 10E are not exhaustive and have been provided to illustrate that the same TPC command sequence may result in multiple different sequences of steps sizes based on the manner in which the TPC command settings illustrated in table 1000 of FIG. 10A are implemented in a TPC mechanism.

Figure 11A:
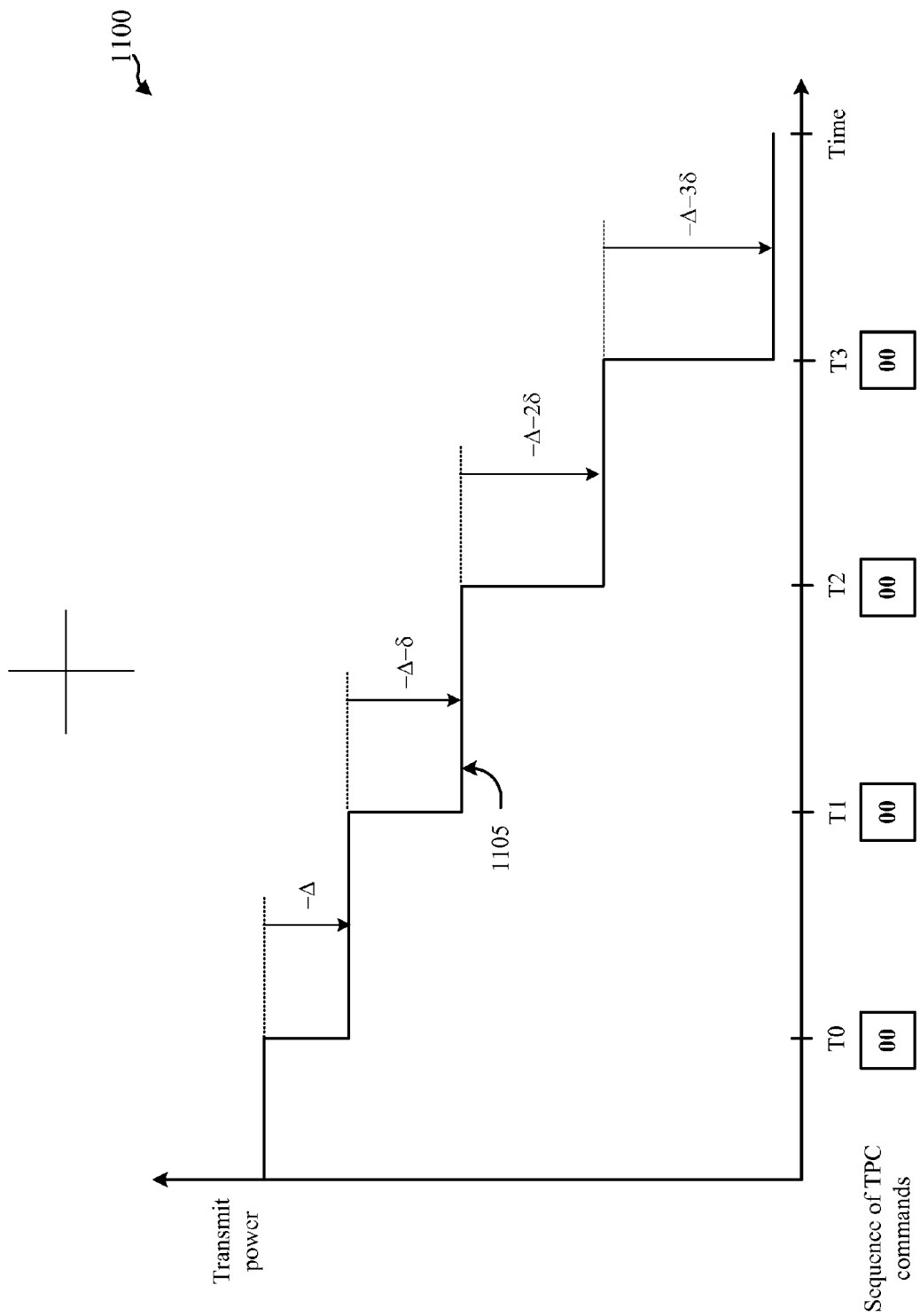
FIG. 11A provides an illustration of a major down trend in accordance with various embodiments.

Turning to FIG. 11A, a chart 1100 is shown that illustrates the use of the TPC command settings in table 1000 of FIG. 10A for transmit power adjustments during a major down trend. In chart 1100, a single line 1105 is shown to represent a series of changes in transmit power based on a TPC command sequence. The TPC command sequence includes four consecutive TPC down commands represented by bit pair (00) at T0, T1, T2, and T3 to rapidly reduce transmit power between T0 and T3.

Figure 11B:
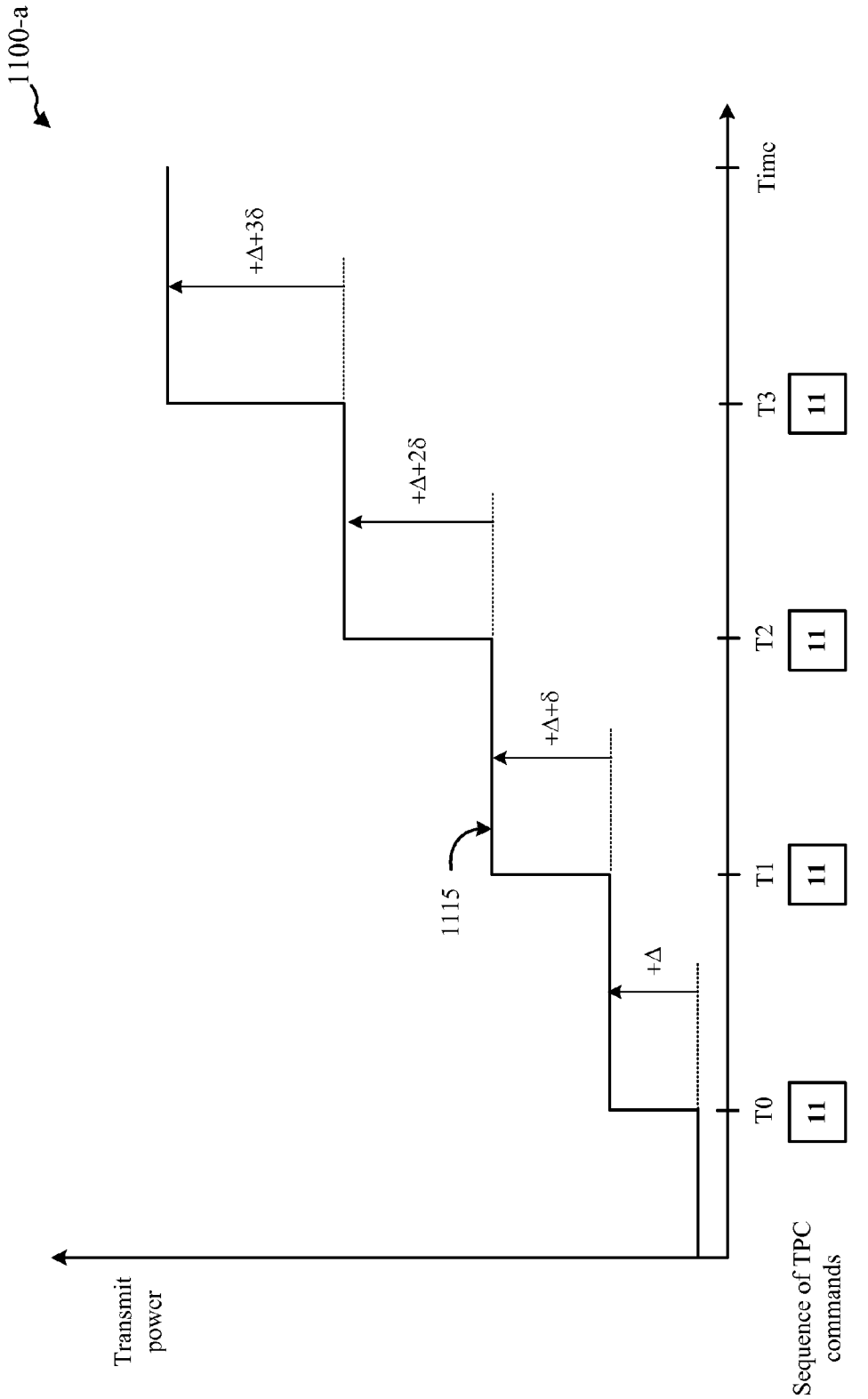
FIG. 11B provides an illustration of a major up trend in accordance with various embodiments.

Turning to FIG. 11B, a chart 1100-*a* is shown that illustrates the use of the TPC command settings in table 1000 of FIG. 10A for transmit power adjustments during a major up trend. In chart 1100-*a*, a single line 1115 is shown to represent a series of changes in transmit power based on a TPC command sequence. The TPC command sequence includes four consecutive TPC up commands represented by bit pair (11) at T0, T1, T2, and T3 to rapidly increase transmit power between T0 and T3.

Figure 11C:
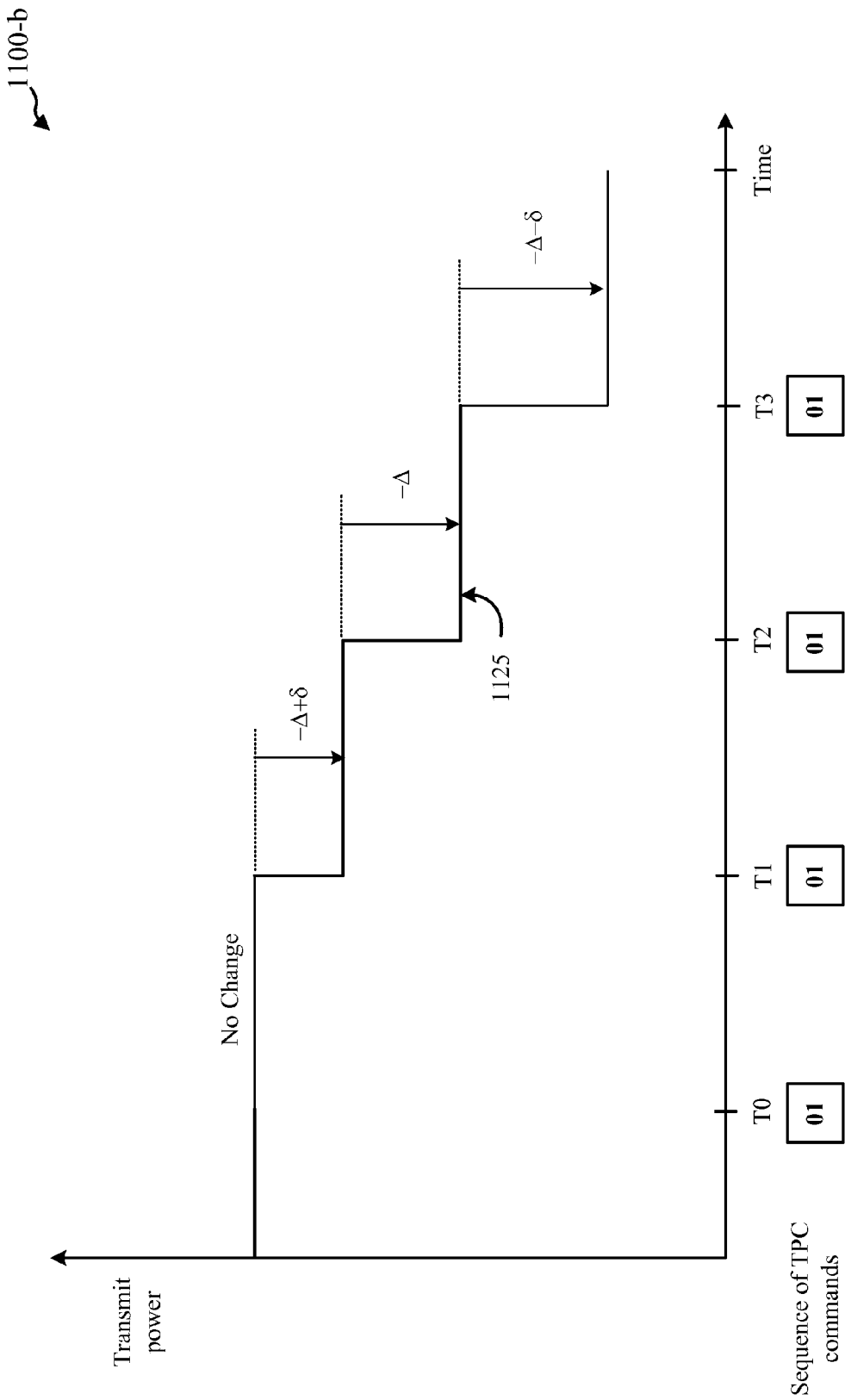
FIG. 11C provides an illustration of a minor down trend in accordance with various embodiments.

Turning to FIG. 11C, a chart 1100-*b* is shown that illustrates the use of the TPC command settings in table 1000 of FIG. 10A for transmit power adjustments during minor down trends. In chart 1100-*a*, a single line 1125 is shown to represent a series of changes in transmit power based on a TPC command sequence. The TPC command sequence includes four consecutive TPC down commands represented by bit pair (01) at T0, T1, T2, and T3 to reduce the transmit power between T0 and T3. This reduction in transmit power may occur more slowly than the one described above with reference to FIG. 11A.

Figure 11D:
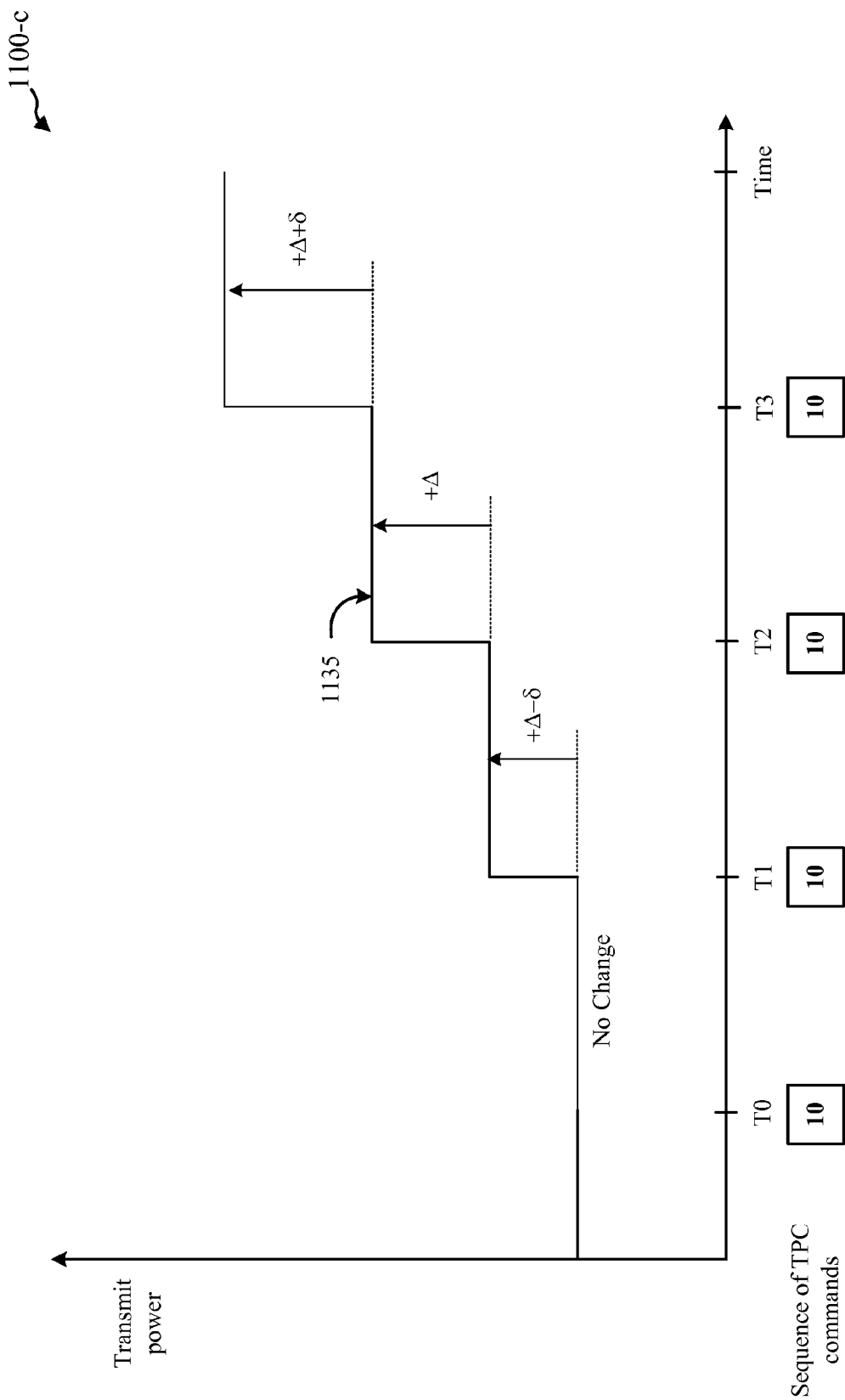
FIG. 11D provides an illustration of a minor up trend in accordance with various embodiments.

Turning to FIG. 11D, a chart 1100-*c* is shown that illustrates the use of the TPC command settings in table 1000 of FIG. 10A for transmit power adjustments during a minor up trend. In chart 1100-*c*, a single line 1135 is shown to represent a series of changes in transmit power based on a TPC command sequence. The TPC command sequence includes four consecutive TPC up commands represented by bit pair (10) at T0, T1, T2, and T3 to increase transmit power between T0 and T3. This increase in transmit power may occur more slowly than the one described above with reference to FIG. 11B.

Charts 1100, 1100-*a*, 1100-*b*, and 1100-*c* illustrate that the TPC command settings in table 1000 may be utilized to produce major and minor trends to provide faster and/or granular up trend catch up and down trend catch up during transmit power control. Although not shown in table 1000, reset techniques may also be used with respect to major and minor trends. For example, after a TPC command is utilized a set number of consecutive times, a next occurrence of the TPC command may result in the TPC step size being reset to the value used at T0 or to another value that may be based on the relative values of $\Delta$ and $\delta$. Additionally, while the charts described above have been generally presented as being step-wise continuous, the utilization of TPC command settings as described herein may result in the use of adaptive step size sequences that are piece-wise linear and/or step size sequences that are partially step-wise continuous and partially piece-wise linear.

As noted above, a reduced spreading factor may result in additional TPC command bits being available. These additional bits may be used to repeat the bit pairs in the TPC commands used in table 1000. FIG. 12A shows a table 1200 in which the TPC commands of table 1000 have their bit pairs repeated by using additional TPC commands bits. Repeating the bit pairs of a TPC command may be a way to improve detection of the TPC command. TPC command bits are not typically encoded and having them repeated may increase the likelihood that they are correctly detected.

The additional TPC command bits available from a reduced spreading factor need not be utilized to repeat bits but may be applied in other ways. For example, having additional bits in a TPC command may allow the most significant bits (MSBs) to establish a major trend so that the major trend is detected correctly. The least significant bits (LSBs) may be utilized to establish a minor trend. Because proper detection of the major trend may be more significant in transmit power control operations, the number of MSBs used for the major trend may be larger than the number of LSBs used for the minor trend. FIG. 12B shows a table 1200-*a* in which the TPC commands of table 1000 have been mapped to a 4-bit TPC commands with the 3 MSBs representing a major trend and the single LSB representing a minor trend. For example, the MSB triple (000) corresponds to major down trend and the MSB triple (111) corresponds to a major up trend. On the other hand, the single LSB (0) and the single LSB (1) correspond to minor trends within the major up trend and the major down trend.

Figure 13:
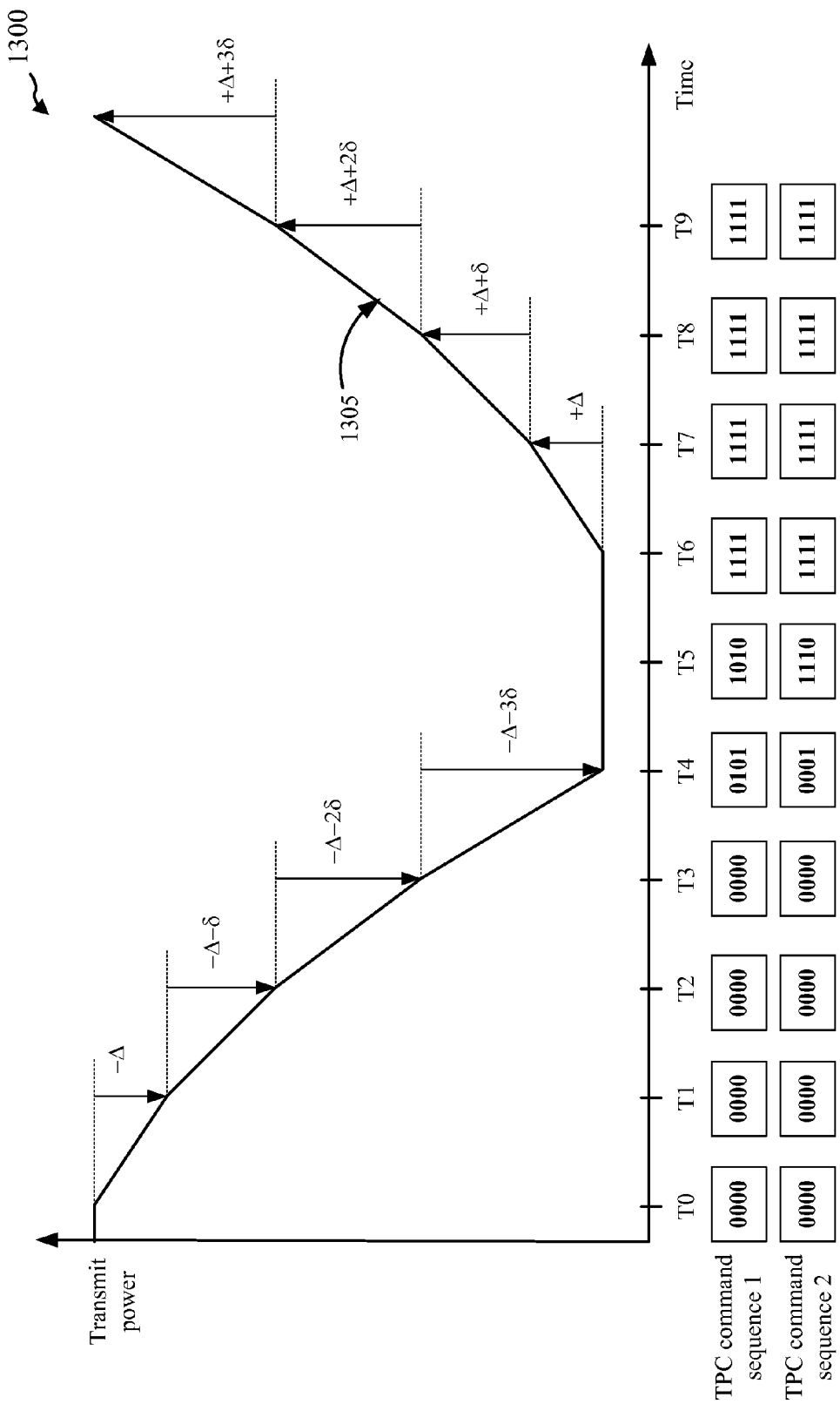
FIG. 13 provides an illustration of major and minor trends with increased TPC command bits in accordance with various embodiments.

Turning to FIG. 13, a chart 1300 is shown that is substantially the same as the combination of chart 1100 in FIG. 11A and chart 1100-*a* of FIG. 11B. The line 1105 in chart 1100 and the line 1115 in chart 1100-*a* results from a TPC command sequence in which each of the TPC commands is a two-bit TPC command. In chart 1300, however, a line 1305, which represents the same transmit power changes as the combination of line 1105 in chart 1100 and line 1115 of chart 1100-*a*, results from TPC command sequences in which each of the TPC commands is a four-bit TPC command. For example, a TPC command sequence 1, which is based on table 1200, may utilize additional TPC command bits to repeat the two bits of the corresponding TPC commands of chart 1300. A TPC command sequence 2, which is based on table 1200-*a*, may utilize additional TPC command bits to configure three MSBs and one LSB to represent major and minor trends of the corresponding TPC commands of chart 1300. Utilizing additional TPC command bits may improve the likelihood that the intended transmit power control changes, or at least its major trends, are correctly detected.

Turning next to FIG. 14, a table 1400 illustrates an example of TPC command settings in which TPC command bits are mapped to certain up or down commands with different step sizes and where both the user equipment 115 and the base station 105 know of these mappings. According to table 1400, a TPC down command represented by bit pair (00) is mapped to a TPC step size of $-2\Delta$, a TPC down command represented by bit pair (01) is mapped to a TPC step size of $-\Delta$, a TPC up command represented by bit pair (10) is mapped to a TPC step size of $+\Delta$, and a TPC up command represented by bit pair (11) is mapped to a TPC step size of $+2\Delta$. In this case, TPC command history or trends need not be involved in the transmit power control operation. When additional TPC command bits are available because of a reduced spreading factor, for example, a higher level of mapping resolution and/or a wider mapping range may be achieved.

As noted above, in addition to the various techniques described herein in which a TPC step size may be dynamically adapted or adjusted based on trend in TPC commands, other techniques may also be used for transmit power control operations that take advantage of the additional TPC command bits that result from reducing the spreading factor in flexible bandwidth carrier systems.

Figure 15A:
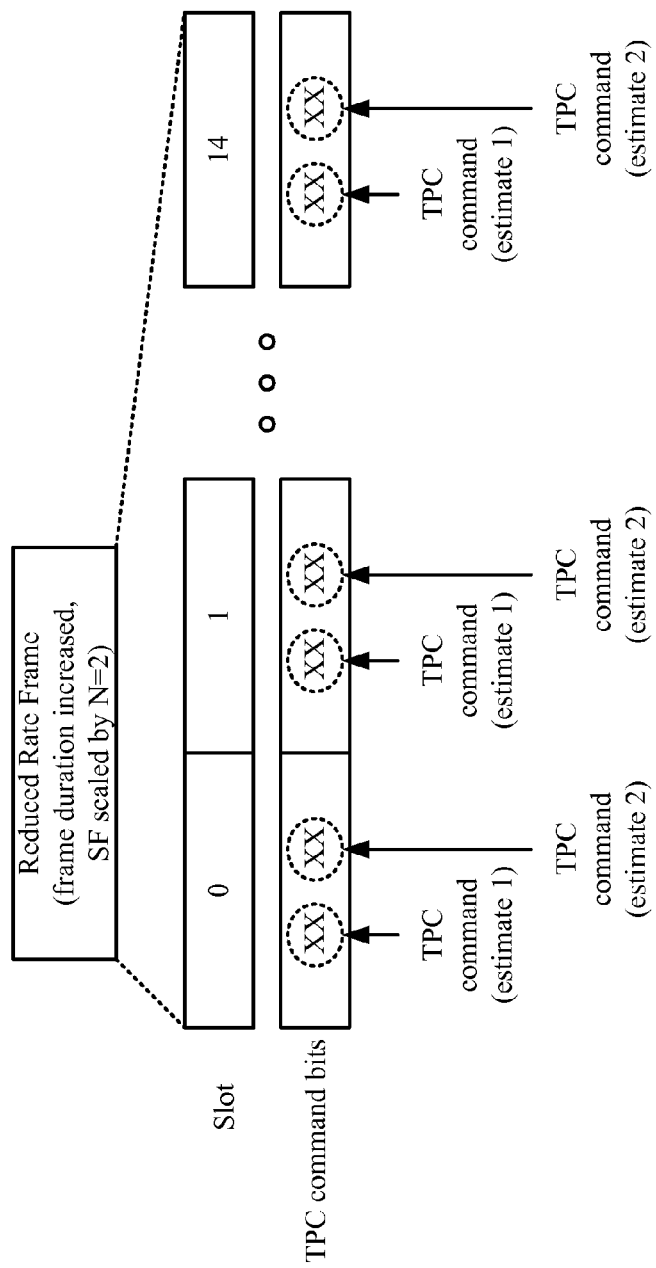
FIG. 15A shows a block diagram of a frame with increased TPC command bits in each slot in accordance with various embodiments.

Turning next to FIG. 15A, a block diagram illustrates a frame 400-*b* in which each slot has additional TPC command bits. The frame 400-*b* may be an example of the frame 400-*a* in FIG. 4B. Because of the spreading factor (SF) scaling associated with the frame 400-*b*, the number of TPC command bits in each slot is increased by N, the bandwidth scaling factor. In this example, N=2 and the total number of TPC command bits in each slot is four. When the additional two bits are used to repeat a TPC command, as illustrated in FIGS. 12A and 13, the TPC rate remains scaled down by N. If, on the other hand, the additional two bits are used to convey an additional and independent TPC command, then the reduced TPC rate may be mitigated.

Conveying multiple independent TPC commands for each slot of a reduced TPC rate frame involves making multiple interference estimates with sub-slot granularity for flexible bandwidth carrier systems (e.g., F-UMTS). These estimates may be signal-to-interference (SIR) estimates that are compared against SIR targets at each sub-slot. Because the number of TPC command bits is increased by N, then N separate SIR estimates may be made to produce N separate and independent TPC commands for each slot. For frame 400-*b*, for example, each slot may have two separate estimates made and each estimate produces an independent TPC command that is mapped to two of the four TPC command bits in each slot. For this technique, the slot configuration may need to be adapted to allow the TPC command bits to be spaced apart and carry independent TPC commands.

Figure 15B:
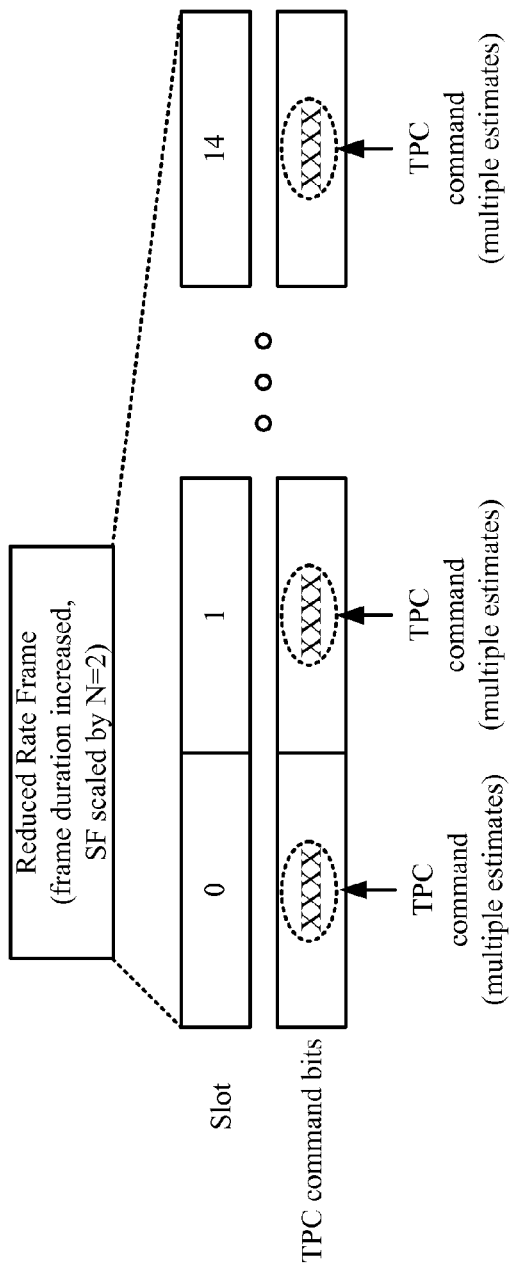
FIG. 15B shows a block diagram of a frame with increased TPC command bits in each slot in accordance with various embodiments.

Turning next to FIG. 15B, a block diagram illustrates a frame 400-*c* in which each slot has additional TPC command bits. The frame 400-*c* may be an example of the frame 400-*a* in FIG. 4B. Because of the spreading factor scaling associated with the frame 400-*c*, the number of TPC command bits in each slot is increased by N, the bandwidth scaling factor. In this example, N=2 and the total number of TPC command bits in each slot is four. Instead of having multiple independent TPC commands produced by the additional TPC command bits, a single four-bit TPC command may be used that is based on multiple interference estimates (e.g., SIR estimates). These multiple interference estimates are compared to target estimates at sub-slot granularity. The four-bit TPC command may be used to provide more detailed transmit power control information.

The TPC technique described with respect to FIG. 15B may utilize TPC step size catch up based on trending as described above, with the TPC step size encoded in the TPC bit pattern and agreed upon by both the user equipment 115 and the base station 105 or network. Unlike utilizing multiple, independent TPC commands in the same slot, this technique need not involve changes to the slot format. Moreover, when the user equipment 115 and base station 105 or network use the same technique, they may be able to adjust the TPC step size based on the TPC bit pattern.

Alternatively, or in addition, to obtaining more TPC command bits for a timeslot in a frame from, for example, changes in the spreading factor that result from utilizing a bandwidth scaling factor, other sources of TPC command bits may be identified. For example, one or more additional codes may be utilized to provide more TPC command bits within a timeslot in a frame.

Figure 16:
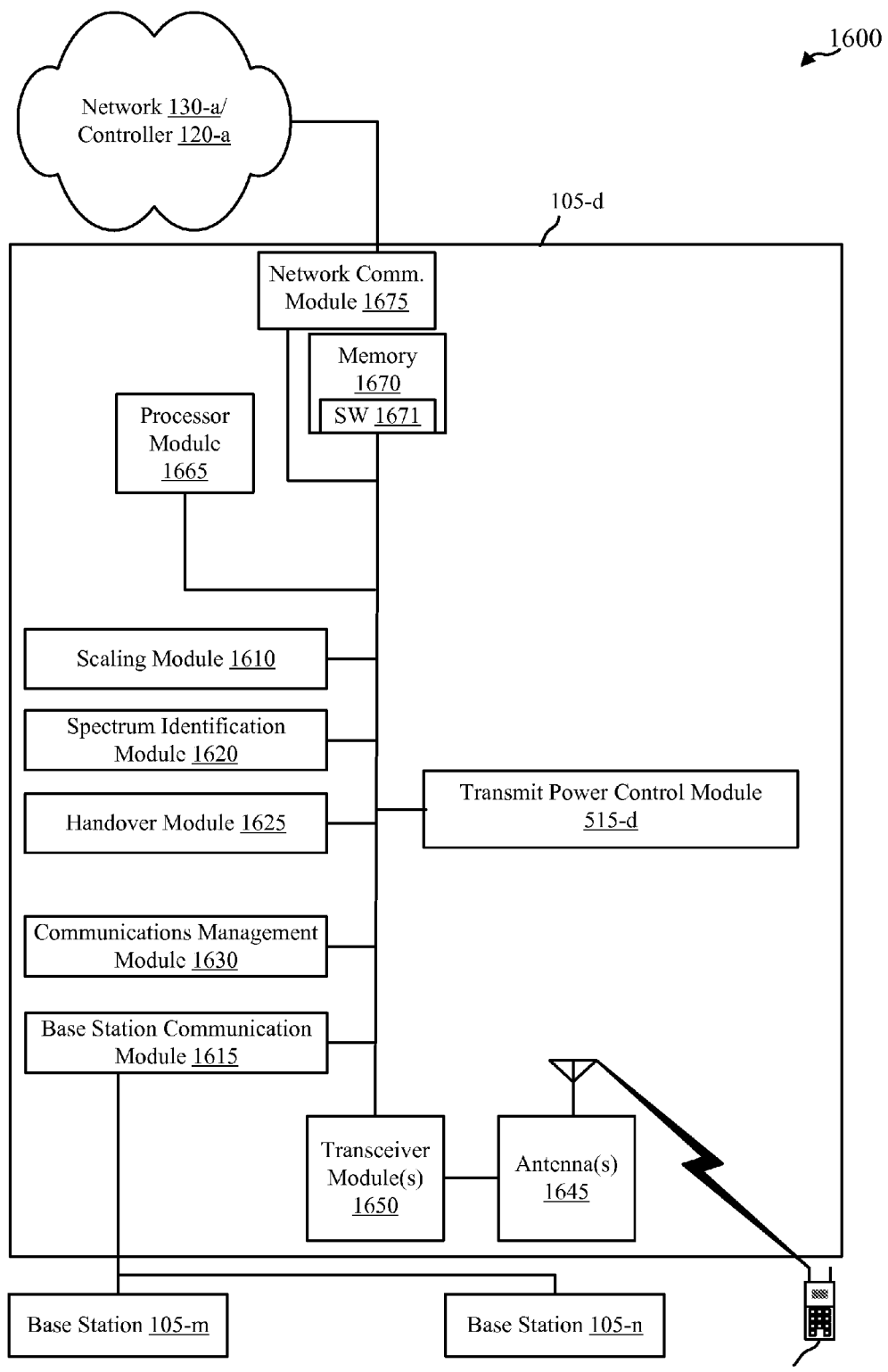
FIG. 16 shows a block diagram of a wireless communications system in accordance with various embodiments.

FIG. 16 shows a block diagram of a communications system 1600 in accordance with various embodiments. This system 1300 may be an example of aspects of the system 100 depicted in FIG. 1, systems 200-*a* and 200-*b* of FIGS. 2A and 2B, system 300 of FIG. 3, and/or system 1800 of FIG. 18. The base station 105-*d* may be configured for transmit power control. In some embodiments, the base station 105-*d* may be the base station 105 of FIG. 1, FIGS. 2A and 2B, FIG. 3, and/or FIG. 18, and/or the devices 500, 500-*a*, 500-*b*, and 500-*c* of FIGS. 5A-5D. The base station 105-*d* may include antennas 1645, a transceiver module 1650, memory 1670, and a processor module 1665, which each may be in communication, directly or indirectly, with each other (e.g., over one or more buses). The transceiver module 1650 may be configured to communicate bi-directionally, via the antennas 1645, with the user equipment 115-*e*, which may be a multi-mode user equipment. The transceiver module 1650 (and/or other components of the base station 105-*d*) may also be configured to communicate bi-directionally with one or more networks. In some cases, the base station 105-*d* may communicate with the network 130-*a* and/or controller 120-*a* through network communications module 1675. Base station 105-*d* may be an example of an eNodeB base station, a Home eNodeB base station, a NodeB base station, and/or a Home NodeB base station. Controller 120-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with user equipment 115-*e* using different wireless communications technologies, such as different Radio Access Technologies. In some cases, base station 105-*d* may communicate with other base stations such as 105-*m* and/or 105-*n* utilizing base station communication module 1615. In some embodiments, base station communication module 1615 may provide an X2 interface within an LTE wireless communication technology to provide communication between some of the base stations 105. In some embodiments, base station 105-*d* may communicate with other base stations through controller 120-*a* and/or network 130-*a*.

The memory 1670 may include random access memory (RAM) and read-only memory (ROM). The memory 1670 may also store computer-readable, computer-executable software code 1671 containing instructions that are configured to, when executed, cause the processor module 1665 to perform various functions described herein (e.g., call processing, database management, message routing, etc.). Alternatively, the software code 1671 may not be directly executable by the processor module 1665 but be configured to cause the computer, e.g., when compiled and executed, to perform functions described herein.

The processor module 1665 may include an intelligent hardware device, e.g., a central processing unit (CPU) such as those made by Intel® Corporation or AMD®, a microcontroller, an application-specific integrated circuit (ASIC), etc. The processor module 1665 may include a speech encoder (not shown) configured to receive audio via a microphone, convert the audio into packets (e.g., 20 ms in length) representative of the received audio, provide the audio packets to the transceiver module 1650, and provide indications of whether a user is speaking. Alternatively, an encoder may only provide packets to the transceiver module 1650, with the provision or withholding/suppression of the packet itself providing the indication of whether a user is speaking.

The transceiver module 1650 may include a modem configured to modulate the packets and provide the modulated packets to the antennas 1645 for transmission, and to demodulate packets received from the antennas 1645. While some examples of the base station 105-$d$ may include a single antenna 1645, the base station 105-$e$ preferably includes multiple antennas 1645 for multiple links which may support carrier aggregation. For example, one or more links may be used to support macro communications with user equipment 115-$e$.

According to the architecture of FIG. 16, the base station 105-$d$ may further include a communications management module 1630. The communications management module 1630 may manage communications with other base stations 105. By way of example, the communications management module 1630 may be a component of the base station 105-$d$ in communication with some or all of the other components of the base station 105-$d$ via a bus. Alternatively, functionality of the communications management module 1630 may be implemented as a component of the transceiver module 1650, as a computer program product, and/or as one or more controller elements of the processor module 1665.

The components for base station 105-$d$ may be configured to implement aspects discussed above with respect to devices 500, 500-$a$, 500-$b$, and 500-$c$ in FIGS. 5A-5D and those aspects may not be repeated here for the sake of brevity. For example, the TPC module 515-$d$ may be an example of the TPC modules 515, 515-$a$, 515-$b$, and 515-$c$ of FIGS. 5A-5D.

The base station 105-$d$ may also include a spectrum identification module 1620. The spectrum identification module 1620 may be utilized to identify spectrum available for flexible waveforms. In some embodiments, a handover module 1625 may be utilized to perform handover procedures of the user equipment 115-$e$ from one base station 105 to another. For example, the handover module 1625 may perform a handover procedure of the user equipment 115-$e$ from base station 105-$d$ to another where normal waveforms are utilized between the user equipment 115-$e$ and one of the base stations and flexible waveforms are utilized between the user equipment and another base station. A scaling module 1610 may be utilized to scale and/or alter chip rates to generate flexible waveforms.

In some embodiments, the transceiver module 1650 in conjunction with antennas 1645, along with other possible components of base station 105-$d$, may transmit information regarding flexible waveforms and/or bandwidth scaling factors from the base station 105-$d$ to the user equipment 115-$e$, to other base stations 105-$m$/105-$n$, or core network 130-$a$. In some embodiments, the transceiver module 1650 in conjunction with antennas 1645, along with other possible components of base station 105-$d$, may transmit information to the user equipment 115-$e$, to other base stations 105-$m$/105-$n$, or core network 130-$a$, such as flexible waveforms and/or bandwidth scaling factors, such that these devices or systems may utilize flexible waveforms. Moreover, in some embodiments, the transceiver module 1650 in conjunction with antennas 1645, along with other possible components of base station 105-$d$, may transmit and/or receive information, such as one or more TPC commands to perform transmit power control operations.

Figure 17:
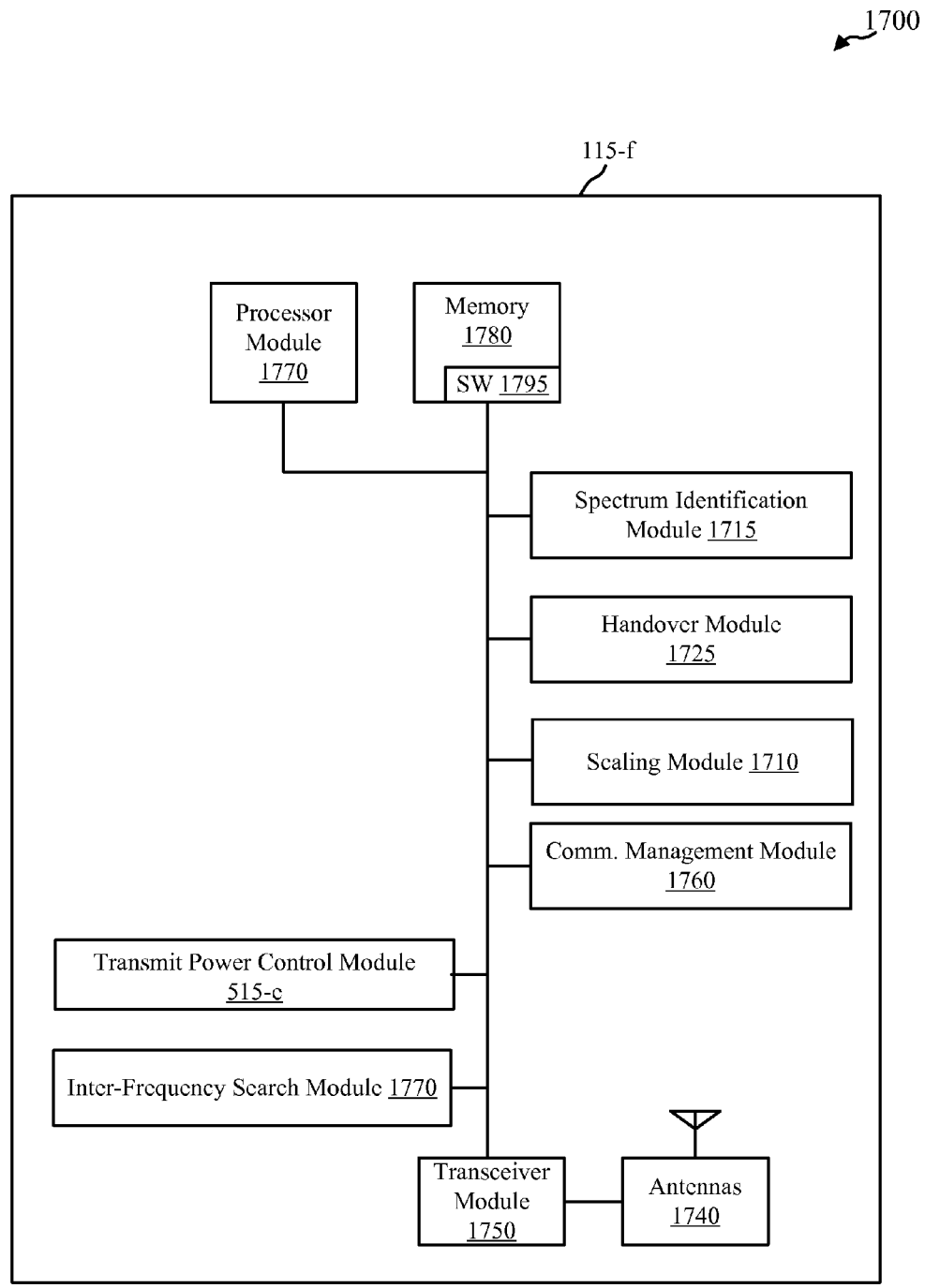
FIG. 17 shows a block diagram of a user equipment in accordance with various embodiments.

FIG. 17 is a block diagram 1700 of a user equipment 115-$f$ configured for transmit power control in accordance with various embodiments. The user equipment 115-$f$ may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-$f$ may have an internal power supply (not shown), such as a small battery, to facilitate mobile operation. The user equipment 115-$f$ may be the user equipment 115 of FIG. 1, FIGS. 2A and 2B, FIG. 3, and/or FIG. 18, and/or the devices 500, 500-$a$, 500-$b$, and 500-$c$ of FIGS. 5A-5D. The user equipment 115-$f$ may be a multi-mode user equipment. The user equipment 115-$f$ may be referred to as a wireless communications device or a user equipment in some cases.

The user equipment 115-$f$ may include antennas 1740, a transceiver module 1750, memory 1780, and a processor module 1770, which each may be in communication, directly or indirectly, with each other (e.g., via one or more buses). The transceiver module 1750 may be configured to communicate bi-directionally, via the antennas 1740 and/or one or more wired or wireless links, with one or more networks, as described above. For example, the transceiver module 1750 may be configured to communicate bi-directionally with base stations 105 of FIG. 1, FIGS. 2A and 2B, FIG. 3, and/or FIG. 18. The transceiver module 1750 may include a modem configured to modulate the packets and provide the modulated packets to the antennas 1740 for transmission, and to demodulate packets received from the antennas 1740. While the user equipment 115-$f$ may include a single antenna, the user equipment 115-$f$ will typically include multiple antennas 1740 for multiple links.

The memory 1780 may include random access memory (RAM) and read-only memory (ROM). The memory 1780 may store computer-readable, computer-executable software code 1795 containing instructions that are configured to, when executed, cause the processor module 1770 to perform various functions described herein (e.g., call processing, database management, message routing, etc.). Alternatively, the software code 1795 may not be directly executable by the processor module 1770 but be configured to cause the computer (e.g., when compiled and executed) to perform functions described herein.

The processor module 1770 may include an intelligent hardware device, e.g., a central processing unit (CPU) such as those made by Intel® Corporation or AMD®, a microcontroller, an application-specific integrated circuit (ASIC), etc. The processor module 1770 may include a speech encoder (not shown) configured to receive audio via a microphone, convert the audio into packets (e.g., 30 ms in length) representative of the received audio, provide the audio packets to the transceiver module 1750, and provide indications of whether a user is speaking. Alternatively, an encoder may only provide packets to the transceiver module 1750, with the provision or withholding/suppression of the packet itself providing the indication of whether a user is speaking.

According to the architecture of FIG. 17, the user equipment 115-f may further include a communications management module 1760. The communications management module 1760 may manage communications with other user equipment 115. By way of example, the communications management module 1760 may be a component of the user equipment 115-f in communication with some or all of the other components of the user equipment 115-f via a bus. Alternatively, functionality of the communications management module 1760 may be implemented as a component of the transceiver module 1750, as a computer program product, and/or as one or more controller elements of the processor module 1770.

The components for user equipment 115-f may be configured to implement aspects discussed above with respect to devices 500, 500-a, 500-b, and 500-c of FIGS. 5A-5D, and those aspects may not be repeated here for the sake of brevity. For example, the TPC module 515-e may be an example of the TPC modules 500, 500-a, 500-b, and 500-c of FIGS. 5A-5D.

The user equipment 115-f may also include a spectrum identification module 1715. The spectrum identification module 1715 may be utilized to identify spectrum available for flexible waveforms. In some embodiments, a handover module 1725 may be utilized to perform handover procedures of the user equipment 115-f from one base station to another. For example, the handover module 1725 may perform a handover procedure of the user equipment 115-f from one base station to another where normal waveforms are utilized between the user equipment 115-f and one of the base stations and flexible waveforms are utilized between the user equipment and another base station. A scaling module 1710 may be utilized to scale and/or alter chip rates to generate flexible waveforms. An inter-frequency search module 1770 may be utilized to search different frequencies for handover operations.

In some embodiments, the transceiver module 1750 in conjunction with antennas 1740, along with other possible components of user equipment 115-f, may transmit information regarding flexible waveforms and/or bandwidth scaling factors from the user equipment 115-f to base stations or a core network. In some embodiments, the transceiver module 1750, in conjunction with antennas 1740 along with other possible components of user equipment 115-f, may transmit information, such as flexible waveforms and/or bandwidth scaling factors, to base stations or a core network such that these devices or systems may utilize flexible waveforms. Moreover, in some embodiments, the transceiver module 1750 in conjunction with antennas 1740, along with other possible components of user equipment 115-f, may transmit and/or receive TPC commands to perform transmit power control operations.

Figure 18:
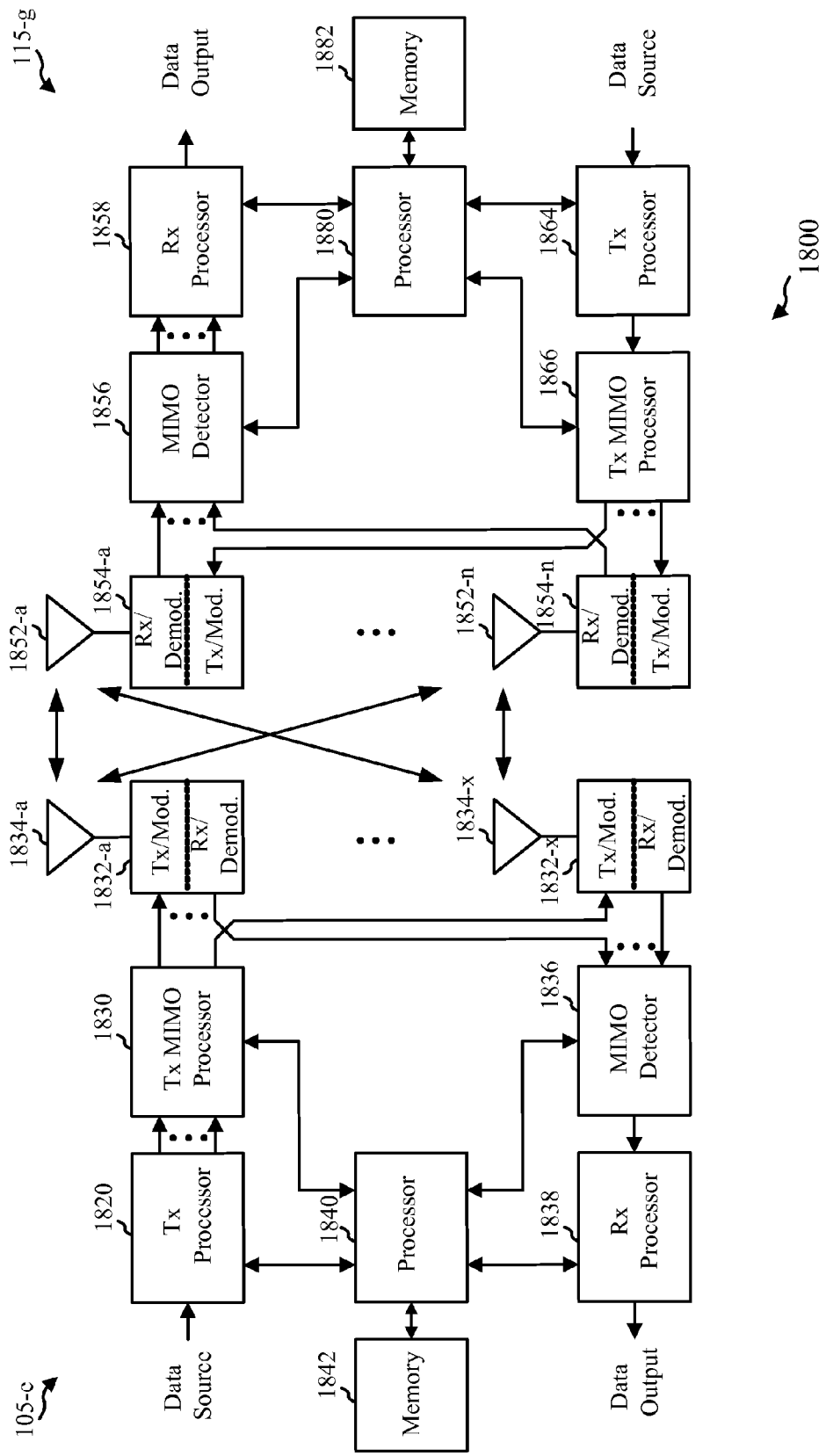
FIG. 18 shows a block diagram of a wireless communications system that includes a base station and a user equipment in accordance with various embodiments.

FIG. 18 is a block diagram of a system 1800 including a base station 105-e and a user equipment 115-g in accordance with various embodiments. This system 1800 may be an example of the system 100 of FIG. 1, systems 200-a and 200-b of FIGS. 2A and 2B, and/or system 300 of FIG. 3. The base station 105-e may be equipped with antennas 1834-a through 1834-x, and the user equipment 115-g may be equipped with antennas 1852-a through 1852-n. At the base station 105-e, a transmitter processor 1820 may receive data from a data source.

The transmitter processor 1820 may process the data. The transmitter processor 1820 may also generate reference symbols, and a cell-specific reference signal. A transmit (TX) MIMO processor 1830 may perform spatial processing (e.g., precoding) on data symbols, control symbols, and/or reference symbols, if applicable, and may provide output symbol streams to the transmit modulators 1832-a through 1832-x. Each modulator 1832 may process a respective output symbol stream (e.g., for OFDM, etc.) to obtain an output sample stream. Each modulator 1832 may further process (e.g., convert to analog, amplify, filter, and upconvert) the output sample stream to obtain a downlink (DL) signal. In one example, DL signals from modulators 1832-a through 1832-x may be transmitted via the antennas 1834-a through 1834-x, respectively. The transmitter processor 1820 may receive information from a processor 1840. The processor 1840 may be configured to generate flexible waveforms through altering a chip rate and/or utilizing a bandwidth scaling factor; this may be done dynamically in some cases. The processor 1840 may also provide for different alignment and/or offsetting procedures. The processor 1840 may also utilize scaling and/or chip rate information to perform measurements on the other subsystems, perform handoffs to the other subsystems, perform reselection, etc. The processor 1840 may invert the effects of time stretching associated with the use of flexible bandwidth through parameter scaling. In some embodiments, the processor 1840 may be implemented as part of a general processor, the transmitter processor 1820, and/or the receiver processor 1838. The processor 1840 may be coupled with a memory 1842.

In some embodiments, processor 1840 and/or Tx processor 1820 are configured to transmit TPC commands to the user equipment 115-g for transmit power control operations. In some embodiments, the processor 1840 is configured for transmit power control operations that are based on multiple interference estimates for a slot, for transmit power control operations that are based on dynamically adapting TPC steps sizes based on trends, and/or for determining and utilizing various metrics related to transmit power control. In some embodiments, the processor 1840 and/or Rx processor 1838 are configured to receive TPC commands from the user equipment 115g for transmit power control operations.

At the user equipment 115-g, the user equipment antennas 1852-a through 1852-n may receive the DL signals from the base station 105-e and may provide the received signals to the demodulators 1854-a through 1854-n, respectively. Each demodulator 1854 may condition (e.g., filter, amplify, downconvert, and digitize) a respective received signal to obtain input samples. Each demodulator 1854 may further process the input samples (e.g., for OFDM, etc.) to obtain received symbols. A MIMO detector 1856 may obtain received symbols from all the demodulators 1854-a through 1854-n, perform MIMO detection on the received symbols if applicable, and provide detected symbols. A receive processor 1858 may process (e.g., demodulate, deinterleave, and decode) the detected symbols, providing decoded data for the user equipment 115-g to a data output, and provide decoded control information to a processor 1880, or memory 1882.

On the uplink (UL), at the user equipment 115-g, a transmitter processor 1864 may receive and process data from a data source. The transmitter processor 1864 may also generate reference symbols for a reference signal. The symbols from the transmitter processor 1864 may be precoded by a transmit MIMO processor 1866 if applicable, further processed by the demodulators 1854-a through 1854-n (e.g., for SC-FDMA, etc.), and be transmitted to the base station 105-e in accordance with the transmission parameters received from the base station 105-*e*. The transmitter processor 1864 may also be configured to generate flexible waveforms through altering a chip rate and/or utilizing a bandwidth scaling factor; this may be done dynamically in some cases. The transmitter processor 1864 may receive information from processor 1880. The processor 1880 may provide for different alignment and/or offsetting procedures. The processor 1880 may also utilize scaling and/or chip rate information to perform measurements on the other subsystems, perform handoffs to the other subsystems, perform reselection, etc. The processor 1880 may invert the effects of time stretching associated with the use of flexible bandwidth through parameter scaling. At the base station 105-*e*, the UL signals from the user equipment 115-*g* may be received by the antennas 1834, processed by the demodulators 1832, detected by a MIMO detector 1836 if applicable, and further processed by a receive processor. The receive processor 1838 may provide decoded data to a data output and to the processor 1880. In some embodiments, the processor 1880 may be implemented as part of a general processor, the transmitter processor 1864, and/or the receiver processor 1858.

In some embodiments, processor 1880 and/or Rx processor 1858 are configured to receive TPC commands from the base station 105-*e* for transmit power control operations. In some embodiments, the processor 1880 is configured for transmit power control operations that are based on multiple interference estimates for a slot, for transmit power control operations that are based on dynamically adapting TPC steps sizes based on trends, and/or for determining and utilizing various metrics related to transmit power control. In some embodiments, the processor 1880 and/or Tx processor 1864 are configured to transmit TPC commands to the base station 105-*e* for transmit power control operations.

Figure 19A:
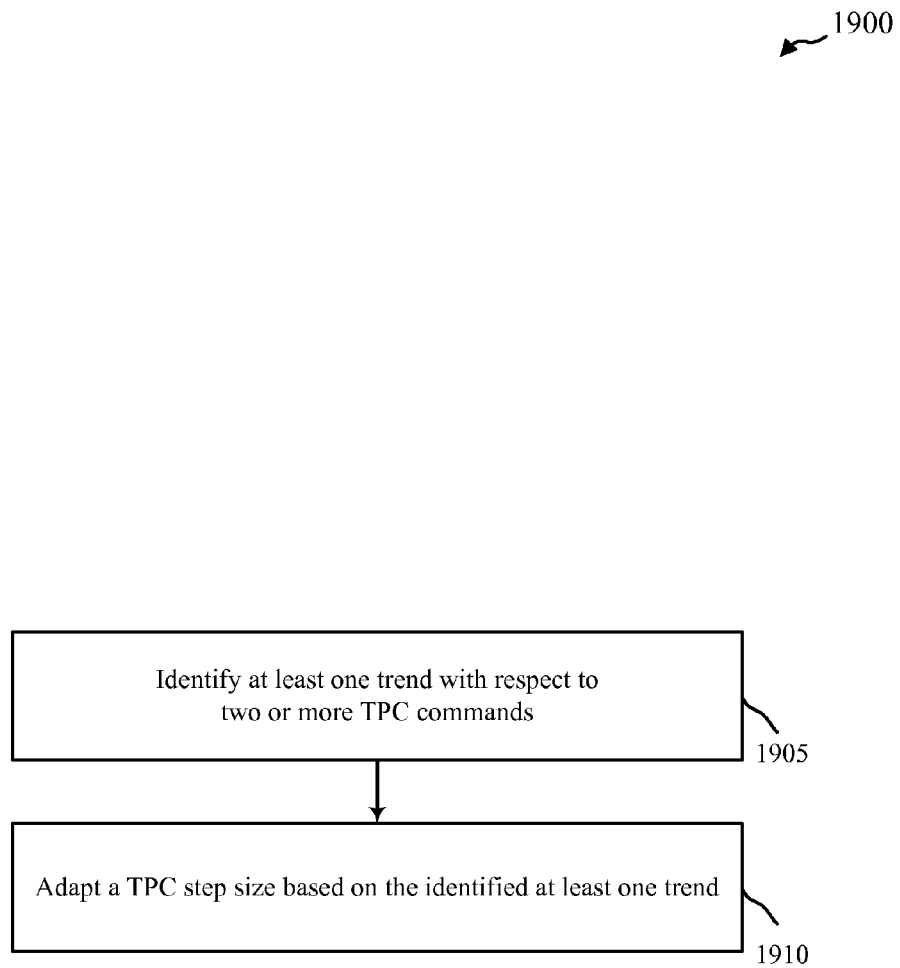
FIG. 19A shows a flow diagram of a method utilized by some wireless communications devices for trend-based adaptation of a TPC step size in accordance with various embodiments.

Turning to FIG. 19A, a flow diagram is shown of a method 1900 for transmit power control in accordance with various embodiments. Method 1900 may be implemented utilizing various wireless communications devices including, but not limited to: a base station 105 as shown in FIG. 1, FIGS. 2A and 2B, FIG. 3, FIG. 16, and/or FIG. 18; a user equipment 115 as shown in FIG. 1, FIGS. 2A and 2B, FIG. 3, FIG. 17, and/or FIG. 18; a device 500 as shown in FIG. 5A; a device 500-*a* as shown in FIG. 5B; and/or a device 500-*c* as shown in FIG. 5D. In some embodiments, method 1900 may be implemented utilizing various wireless communications devices including, but not limited to: a core network 130 and/or controller 120 as seen in FIG. 1, and/or a core network 130-*a* and/or a controller 120-*a* as seen in FIG. 16.

At block 1905, at least one trend may be identified with respect to two or more TPC commands. Identifying the at least one trend may include identifying that a same TPC command has been utilized two or more consecutive times. Identifying the at least one trend may include identifying a major trend and identifying a minor trend. At block 1910, a TPC step size may be adapted based on the identified at least one trend. When a major trend and a minor trend are identified, the TPC step size may be adapted based on at least the identified major trend or the identified minor trend. The identified major trend may indicate a first component of the TPC step size and the identified minor trend may indicate a second component of the TPC step size component smaller than the first component.

In some embodiments of the method 1900, a reduced TPC rate is identified and the identified reduced TPC rate is compensated through the adapted TPC step size. The reduced TPC rate may include a normal TPC rate for a normal bandwidth carrier system scaled with a bandwidth scaling factor for a flexible bandwidth carrier system.

In some embodiments of the method 1900, a reduced spreading factor is identified, where the reduced spreading factor includes a normal spreading factor for a normal bandwidth carrier system scaled with a bandwidth scaling factor for a flexible bandwidth carrier system. The TPC step size may be adapted with additional TPC command bits resulting from the reduced spreading factor. The additional TPC command bits may result in a TPC command in which one or more of the most significant bits represent a major trend and one or more of the least significant bits represent a minor trend. In some embodiments, a source of TPC command bits is identified and the TPC step size is adapted with additional TPC command bits resulting from the identified source of TPC command bits. An example of another source of TPC command bits is to utilize an additional code.

In some embodiments of the method 1900, a current metric is determined with respect to a current TPC mechanism that supports adapting the TPC step size based on the identified at least one trend, the current metric is compared to a reference metric with respect to a reference TPC mechanism, and TPC operations are adapted based on the comparison. Adapting the TPC operations may include selecting one of the current TPC mechanism and the reference TPC mechanism to perform the TPC operations. The current metric and the reference metric may be based on a rise-over-normal technique. The current metric may be obtained by determining an ideal power with respect to the current TPC mechanism, determining a received power with respect to the current TPC mechanism, and calculating the current metric based on a time average of the difference between the received power and the ideal power. Rise-over-normal may represent an increase in a typical or expected metric when a different TPC mechanism or a different step size is applied to UMTS or F-UMTS.

Figure 19B:
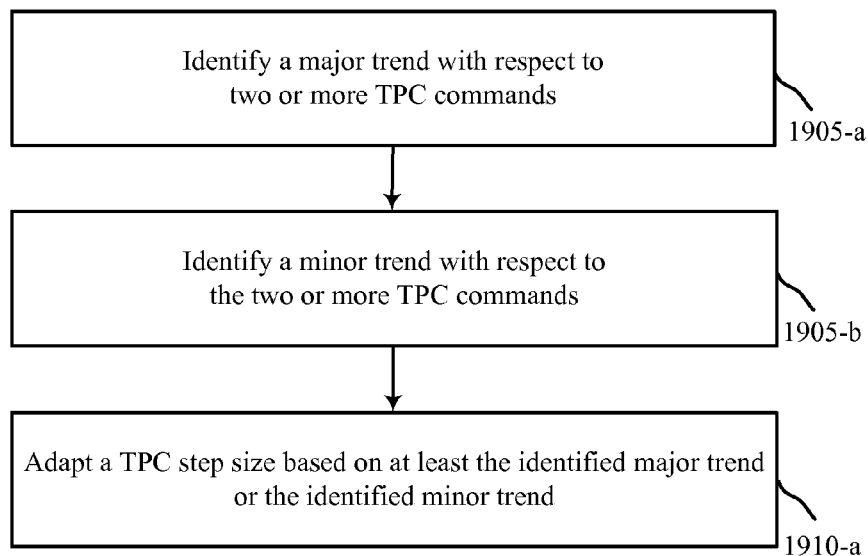
FIG. 19B shows a flow diagram of another method utilized by some wireless communications devices for trend-based adaptation of a TPC step size in accordance with various embodiments.

Turning to FIG. 19B, a flow diagram is shown of a method 1900-*a* for transmit power control in accordance with various embodiments. Method 1900-*a*, like method 1900 above, may be implemented utilizing various wireless communications devices including, but not limited to: a base station 105 as shown in FIG. 1, FIGS. 2A and 2B, FIG. 3, FIG. 16, and/or FIG. 18; a user equipment 115 as shown in FIG. 1, FIGS. 2A and 2B, FIG. 3, FIG. 17, and/or FIG. 18; a device 500 as shown in FIG. 5A; a device 500-*a* as shown in FIG. 5B; and/or a device 500-*c* as shown in FIG. 5D. Method 1900-*a* may include one or more aspects of method 1900 of FIG. 19A.

At block 1905-*a*, a major trend may be identified with respect to two or more TPC commands. At block 1905-*b*, a minor trend may be identified with respect to two or more TPC commands. At block 1910-*a*, a TPC step size may be adapted based on at least the identified major trend or the identified minor trend. Various aspects of major and minor trends and the adaptation of a TPC step size according to those trends are illustrated in, for example, FIGS. 10-13.

Figure 19C:
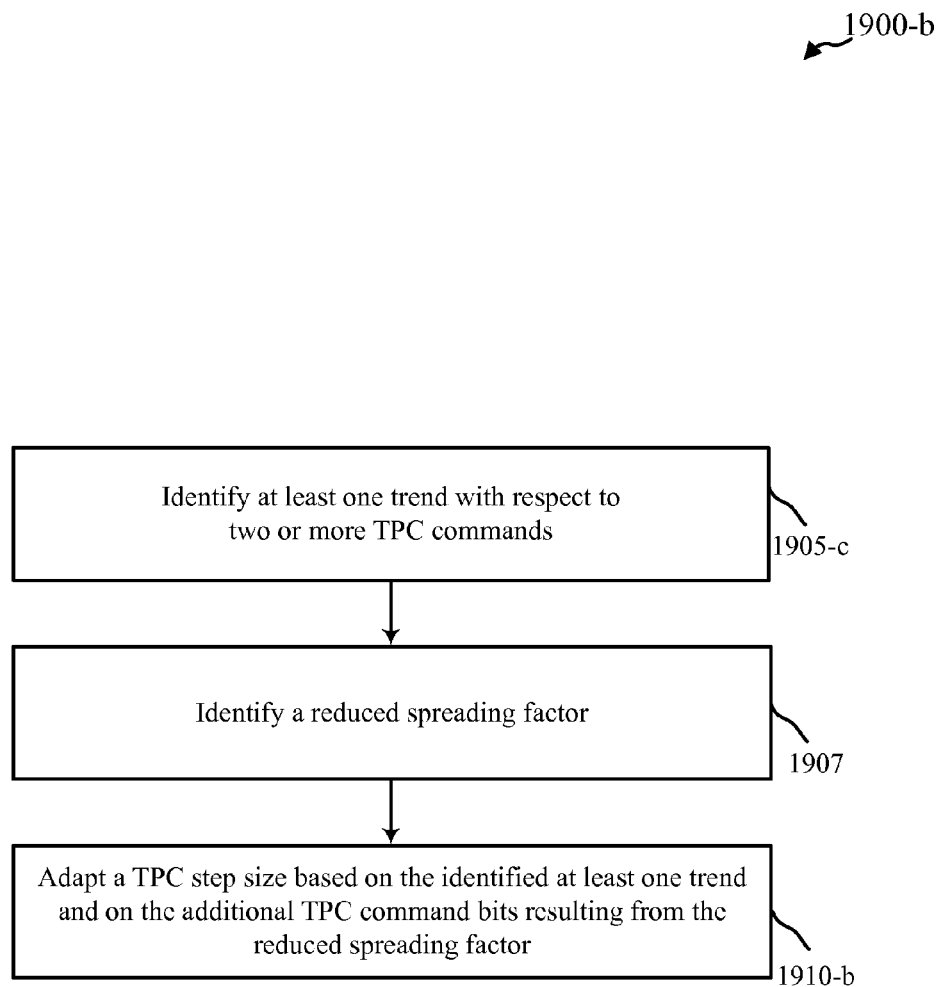
FIG. 19C shows a flow diagram of yet another method utilized by some wireless communications devices for trend-based adaptation of a TPC step size in accordance with various embodiments.

Turning to FIG. 19C, a flow diagram is shown of a method 1900-*b* for transmit power control in accordance with various embodiments. Method 1900-*b*, like method 1900 above, may be implemented utilizing various wireless communications devices including, but not limited to: a base station 105 as shown in FIG. 1, FIGS. 2A and 2B, FIG. 3, FIG. 16, and/or FIG. 18; a user equipment 115 as shown in FIG. 1, FIGS. 2A and 2B, FIG. 3, FIG. 17, and/or FIG. 18; a device 500 as shown in FIG. 5A; a device 500-*a* as shown in FIG. 5B; and/or a device 500-*c* as shown in FIG. 5D. Method 1900-*b* may include one or more aspects of method 1900 of FIG. 19A.

At block 1905-*c*, at least one trend may be identified with respect to two or more TPC commands. Identifying the at least one trend may include identifying that a same TPC command has been utilized two or more consecutive times.

Identifying the at least one trend may include identifying a major trend and identifying a minor trend. At block 1907, a reduced spreading factor may be identified, wherein the reduced spreading factor includes a normal spreading factor for a normal bandwidth carrier system scaled with a bandwidth scaling factor for a flexible bandwidth carrier system. At block 1910-b, a TPC step size may be adapted based on the identified at least one trend and on additional TPC command bits resulting from the reduced spreading factor. The additional TPC command bits may result in a TPC command in which one or more of the most significant bits represent a major trend and one or more of the least significant bits represent a minor trend.

Figure 20A:
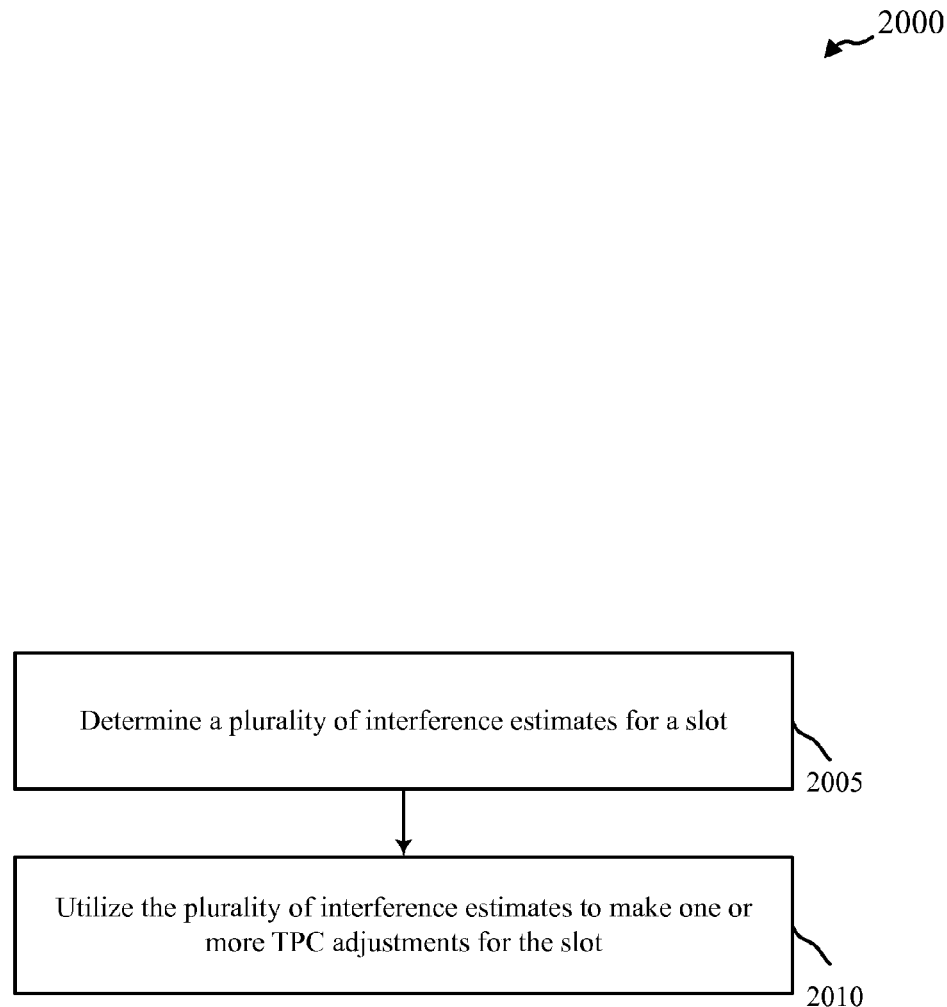
FIG. 20A shows a flow diagram of a method utilized by some wireless communications devices for TPC adjustments in accordance with various embodiments.

Turning to FIG. 20A, a flow diagram is shown of a method 2000 for transmit power control in accordance with various embodiments. Method 2000 may be implemented utilizing various wireless communications devices including, but not limited to: a base station 105 as shown in FIG. 1, FIGS. 2A and 2B, FIG. 3, FIG. 16, and/or FIG. 18; a user equipment 115 as shown in FIG. 1, FIGS. 2A and 2B, FIG. 3, FIG. 17, and/or FIG. 18; a device 500 as shown in FIG. 5A; a device 500-b as shown in FIG. 5C; and/or a device 500-c as shown in FIG. 5D. In some embodiments, method 2000 may be implemented utilizing various wireless communications devices including, but not limited to: a core network 130 and/or controller 120 as seen in FIG. 1, and/or a core network 130-a and/or a controller 120-a as seen in FIG. 16.

At block 2005, a plurality of interference estimates may be determined for a slot. The interference estimates may include at least one SIR estimate. At block 2010, the plurality of interference estimates may be utilized to make one or more TPC adjustments for the slot. Utilizing the interference estimates may include transmitting multiple independent TPC commands for the slot where each of the independent TPC commands is based on one or more of the plurality of interference estimates for the slot. Utilizing the interference estimates may include adjusting a transmit power multiple times, where each adjustment corresponds to an independent TPC command based on one of the plurality of interference estimates for the slot. Utilizing the interference estimates may include adjusting a TPC step size based on the plurality of interference estimates for the slot.

In some embodiments of the method 2000, a reduced TPC rate is identified and the identified reduced TPC rate is utilized to make the one or more TPC adjustments. The reduced TPC rate may include a normal TPC rate for a normal bandwidth carrier system scaled with a bandwidth scaling factor for a flexible bandwidth carrier system.

In some embodiments of the method 2000, a spreading factor is reduced by a bandwidth scaling factor for a flexible bandwidth carrier system, the reduction in the spreading factor resulting in an increased number of TPC command bits for the slot. Two or more TPC commands for the slot may be conveyed based on the increased number of TPC command bits and on the plurality of interference estimates for the slot. In some embodiments, an additional code is identified resulting in an increased number of TPC command bits for the slot.

In some embodiments of the method 2000, a current metric is determined with respect to a current TPC mechanism that supports utilizing the plurality of interference estimates to make one or more TPC adjustments for the slot, the current metric is then compared to a reference metric with respect to a reference TPC mechanism, and TPC operations are adapted based on the comparison. Adapting the TPC operations may include selecting one of the current TPC mechanism and the reference TPC mechanism to perform the TPC operations. The current metric and the reference metric may be based on a rise-over-normal technique. The current metric may be obtained by determining an ideal power with respect to the current TPC mechanism, determining a received power with respect to the current TPC mechanism, and calculating the current metric based on a time average of the difference between the received power and the ideal power. Rise-over-normal may represent an increase in a typical or expected metric when a different TPC mechanism or a different step size is applied to UMTS or F-UMTS.

Figure 20B:
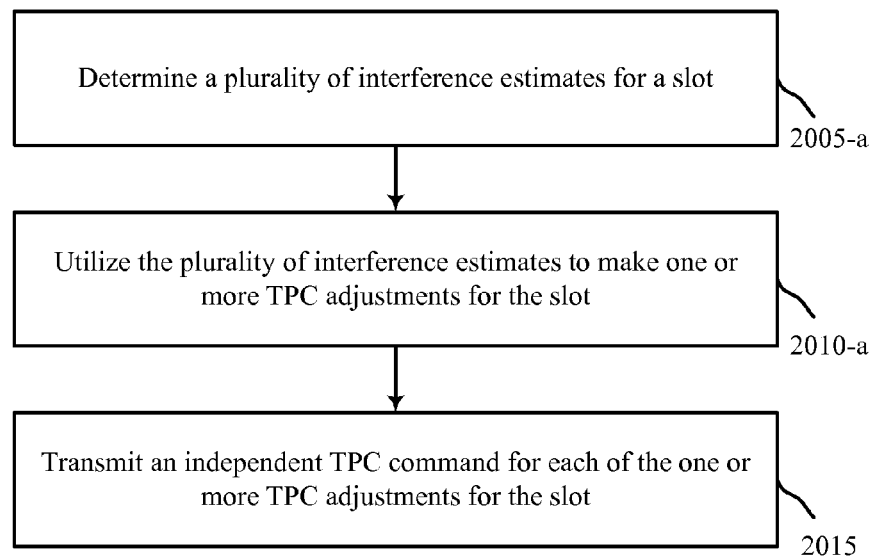
FIG. 20B shows a flow diagram of another method utilized by some wireless communications devices for TPC adjustments in accordance with various embodiments.

Turning to FIG. 20B, a flow diagram is shown of a method 2000-a for transmit power control in accordance with various embodiments. Method 2000-a, like method 2000 above, may be implemented utilizing various wireless communications devices including, but not limited to: a base station 105 as shown in FIG. 1, FIGS. 2A and 2B, FIG. 3, FIG. 16, and/or FIG. 18; a user equipment 115 as shown in FIG. 1, FIGS. 2A and 2B, FIG. 3, FIG. 17, and/or FIG. 18; a device 500 as shown in FIG. 5A; a device 500-b as shown in FIG. 5C; and/or a device 500-c as shown in FIG. 5D. Method 2000-a may include one or more aspects of method 2000 of FIG. 20A.

At block 2005-a, a plurality of interference estimates may be determined for a slot. The interference estimates may include at least one SIR estimate. At block 2010-a, the plurality of interference estimates may be utilized to make one or more TPC adjustments for the slot. At block 2015, an independent TPC command may be transmitted for each of the one or more TPC adjustments for the slot.

Figure 20C:
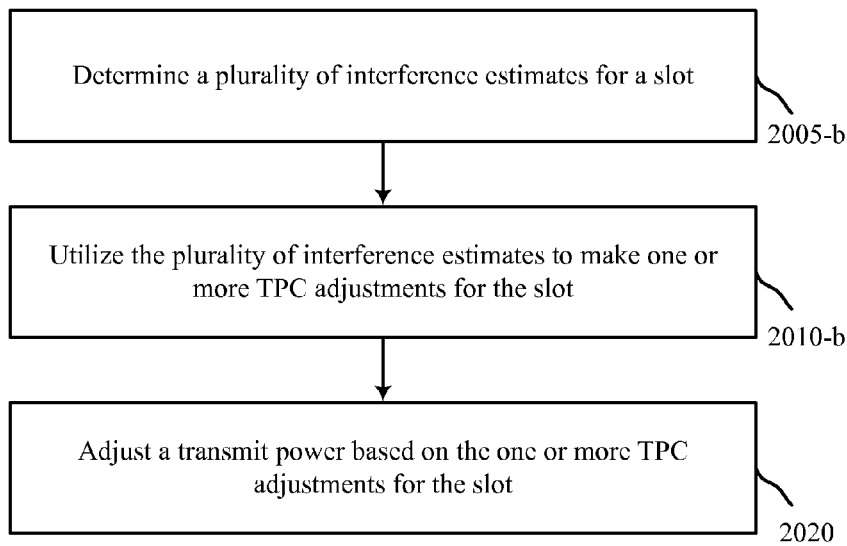
FIG. 20C shows a flow diagram of yet another method utilized by some wireless communications devices for TPC adjustments in accordance with various embodiments.

Turning to FIG. 20C, a flow diagram is shown of a method 2000-b for transmit power control in accordance with various embodiments. Method 2000-b, like method 2000 above, may be implemented utilizing various wireless communications devices including, but not limited to: a base station 105 as shown in FIG. 1, FIGS. 2A and 2B, FIG. 3, FIG. 16, and/or FIG. 18; a user equipment 115 as shown in FIG. 1, FIGS. 2A and 2B, FIG. 3, FIG. 17, and/or FIG. 18; a device 500 as shown in FIG. 5A; a device 500-b as shown in FIG. 5C; and/or a device 500-c as shown in FIG. 5D. Method 2000-b may include one or more aspects of method 2000 of FIG. 20A.

At block 2005-b, a plurality of interference estimates may be determined for a slot. The interference estimates may include at least one SIR estimate. At block 2010-b, the plurality of interference estimates may be utilized to make one or more TPC adjustments for the slot. At block 2020, a transmit power may be adjusted based on the one or more TPC adjustments for the slot.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for transmit power control (TPC) in a wireless communications system, comprising:
    identifying at least one trend with respect to two or more TPC commands, wherein the trend is associated with a reduced TPC rate that is based at least in part on scaling a normal TPC rate for a normal bandwidth carrier system with a bandwidth scaling factor associated with a flexible bandwidth carrier system, wherein the TPC rate is associated with a rate at which the two or more TPC commands are sent;
    adapting a TPC step size based on the identified at least one trend associated with the reduced TPC rate, wherein adapting the TPC step size compensates for the reduced TPC rate; and
    transmitting the adapted TPC step size in a TPC command to a first device, the TPC command associated with the first device adapting its transmission power based at least in part on the received TPC command.

2. The method of claim 1, wherein identifying the at least one trend comprises:
    identifying a major trend; and
    identifying a minor trend, and wherein adapting the TPC step size is based on at least the identified major trend or the identified minor trend.

3. The method of claim 2, wherein the identified major trend indicates a first component of the TPC step size and the identified minor trend indicates a second component of the TPC step size smaller than the first component.

4. The method of claim 1, wherein identifying the at least one trend comprises:
    identifying that a same TPC command has been utilized two or more consecutive times.

5. The method of claim 1, further comprising:
    identifying a reduced spreading factor, wherein the reduced spreading factor includes a normal spreading factor for the normal bandwidth carrier system scaled with the bandwidth scaling factor for the flexible bandwidth carrier system; and
    adapting the TPC step size with additional TPC command bits resulting from the reduced spreading factor.

6. The method of claim 1, further comprising:
    identifying a source of TPC commands bits; and
    adapting the TPC step size with additional TPC command bits resulting from the identified source of TPC commands.

7. The method of claim 5, wherein:
    the additional TPC command bits result in the TPC command in which one or more of most significant bits represent a major trend and one or more of least significant bits represent a minor trend.

8. The method of claim 1, further comprising:
    determining a current metric with respect to a current TPC mechanism that supports adapting the TPC step size based on the identified at least one trend;
    comparing the current metric to a reference metric with respect to a reference TPC mechanism; and
    adapting TPC operations based on the comparison.

9. The method of claim 8, wherein determining the current metric comprises:
    determining an ideal power with respect to the current TPC mechanism;
    determining a received power with respect to the current TPC mechanism; and
    calculating the current metric based on a time average of difference between the received power and the ideal power.

10. The method of claim 8, wherein adapting TPC operations comprises:
   selecting one of the current TPC mechanism and the reference TPC mechanism to perform TPC operations.

11. A wireless communications system, comprising:
   means for identifying at least one trend with respect to two or more TPC commands, wherein the trend is associated with a reduced TPC rate that is based at least in part on scaling a normal TPC rate for a normal bandwidth carrier system with a bandwidth scaling factor associated with a flexible bandwidth carrier system, wherein the TPC rate is associated with a rate at which the two or more TPC commands are sent;
   means for adapting a TPC step size based on the identified at least one trend associated with the reduced TPC rate, wherein adapting the TPC step size compensates for the reduced TPC rate; and
   means for transmitting the adapted TPC step size in a TPC command to a first device, the TPC command associated with the first device adapting its transmission power based at least in part on the received TPC command.

12. The wireless communications system of claim 11, wherein the means for identifying the at least one trend comprise:
   means for identifying a major trend; and
   means for identifying a minor trend, and wherein adapting the TPC step size is based on at least the identified major trend or the identified minor trend.

13. The wireless communications system of claim 11, wherein means for identifying the at least one trend comprise:
   means for identifying that a same TPC command has been utilized two or more consecutive times.

14. The wireless communications system of claim 11, further comprising:
   means for identifying a reduced spreading factor, wherein the reduced spreading factor includes a normal spreading factor for the normal bandwidth carrier system scaled with the bandwidth scaling factor for the flexible bandwidth carrier system; and
   means for adapting the TPC step size with additional TPC command bits resulting from the reduced spreading factor.

15. The wireless communications system of claim 11, further comprising:
   means for identifying a source of TPC commands bits; and
   means for adapting the TPC step size with additional TPC command bits resulting from the identified source of TPC commands.

16. The wireless communications system of claim 14, wherein:
   the additional TPC command bits result in the TPC command in which one or more of most significant bits represent a major trend and one or more of least significant bits represent a minor trend.

17. The wireless communications system of claim 11, further comprising:
   means for determining a current metric with respect to a current TPC mechanism that supports adapting the TPC step size based on the identified at least one trend;
   means for comparing the current metric to a reference metric with respect to a reference TPC mechanism; and
   means for adapting TPC operations based on the comparison.

18. The wireless communications system of claim 17, wherein the means for determining the current metric comprise:
   means for determining an ideal power with respect to the current TPC mechanism;
   means for determining a received power with respect to the current TPC mechanism; and
   means for calculating the current metric based on a time average of a difference between the received power and the ideal power.

19. A wireless communications device, comprising:
   at least one processor communicatively coupled with a memory, the memory comprising executable code that, when executed by the at least one processor, causes the at least one processor to:
   identify at least one trend with respect to two or more TPC commands, wherein the trend is associated with a reduced TPC rate that is based at least in part on scaling a normal TPC rate for a normal bandwidth carrier system with a bandwidth scaling factor associated with a flexible bandwidth carrier system, wherein the TPC rate is associated with a rate at which the two or more TPC commands are sent;
   adapt a TPC step size based on the identified at least one trend associated with the reduced TPC rate, wherein adapting the TPC step size compensates for the reduced TPC rate; and
   transmit the adapted TPC step size in a TPC command to a first device, the TPC command associated with the first device adapting its transmission power based at least in part on the received TPC command.

20. The wireless communications device of claim 19, wherein the executable code causes the at least one processor to:
   identify a major trend; and
   identify a minor trend, and wherein adaptation of the TPC step size is based on at least the identified major trend or the identified minor trend.

21. The wireless communications device of claim 19, wherein the executable code causes the at least one processor to:
   identify that a same TPC command has been utilized two or more consecutive times.

22. The wireless communications device of claim 19, wherein the executable code causes the at least one processor to:
   identify a reduced spreading factor, wherein the reduced spreading factor includes a normal spreading factor for the normal bandwidth carrier system scaled with the bandwidth scaling factor for the flexible bandwidth carrier system; and
   adapt the TPC step size with additional TPC command bits resulting from the reduced spreading factor.

23. The wireless communications device of claim 19, wherein the executable code causes the at least one processor to:
   identify a source of TPC commands bits; and
   adapt the TPC step size with additional TPC command bits resulting from the identified source of TPC commands.

24. The wireless communications device of claim 22, wherein:
   the additional TPC command bits result in the TPC command in which one or more of most significant bits represent a major trend and one or more of least significant bits represent a minor trend.

25. The wireless communications device of claim 19, wherein the executable code causes the at least one processor to:

determine a current metric with respect to a current TPC mechanism that supports adaptation of the TPC step size based on the identified at least one trend;

compare the current metric to a reference metric with respect to a reference TPC mechanism; and adapt TPC operations based on the comparison.

26. The wireless communications device of claim 25, wherein the executable code causes the at least one processor to:

determine an ideal power with respect to the current TPC mechanism;

determine a received power with respect to the current TPC mechanism; and calculate the current metric based on a time average of a difference between the received power and the ideal power.

27. A computer program product for transmit power control (TPC) in a wireless communications system, comprising:

a non-transitory computer-readable medium comprising:

code configured to identify at least one trend with respect to two or more TPC commands, wherein the trend is associated with a reduced TPC rate that is based at least in part on scaling a normal TPC rate for a normal bandwidth carrier system with a bandwidth scaling factor associated with a flexible bandwidth carrier system, wherein the TPC rate is associated with a rate at which the two or more TPC commands are sent;

code configure to adapt a TPC step size based on the identified at least one trend associated with the reduced TPC rate, wherein adapting the TPC step size compensates for the reduced TPC rate; and code configured to transmit the adapted TPC step size in a TPC command to a first device, the TPC command associated with the first device adapting its transmission power based at least in part on the received TPC command.

28. The computer program product of claim 27, wherein the non-transitory computer-readable medium comprises:

code configured to identify a major trend; and code configured to identify a minor trend, and wherein adaptation of the TPC step size is based on at least the identified major trend or the identified minor trend.

29. The computer program product of claim 27, wherein the non-transitory computer-readable medium comprises:

code configured to identify that a same TPC command has been utilized two or more consecutive times.

30. The computer program product of claim 27, wherein the non-transitory computer-readable medium comprises:

code configured to identify a reduced spreading factor, wherein the reduced spreading factor includes a normal spreading factor for the normal bandwidth carrier system scaled with the bandwidth scaling factor for the flexible bandwidth carrier system; and code configured to adapt the TPC step size with additional TPC command bits resulting from the reduced spreading factor.

31. The computer program product of claim 27, wherein the non-transitory computer-readable medium comprises:

code configured to identify a source of TPC commands bits; and code configured to adapt the TPC step size with additional TPC command bits resulting from the identified source of TPC commands.

32. The computer program product of claim 30, wherein:

the additional TPC command bits result in the TPC command in which one or more of most significant bits represent a major trend and one or more of least significant bits represent a minor trend.

33. The computer program product of claim 27, wherein the non-transitory computer-readable medium comprises:

code configured to determine a current metric with respect to a current TPC mechanism that supports adaptation of the TPC step size based on the identified at least one trend;

code configured to compare the current metric to a reference metric with respect to a reference TPC mechanism; and code configured to adapt TPC operations based on the comparison.

34. The computer program product of claim 33, wherein the non-transitory computer-readable medium comprises:

code configured to determine an ideal power with respect to the current TPC mechanism;

code configured to determine a received power with respect to the current TPC mechanism; and code configured to calculate the current metric based on a time average of a difference between the received power and the ideal power.

35. A method for transmit power control (TPC) in a wireless communications system, comprising:

identifying in a first device, a TPC command sent from a second device, the identified TPC command being from a set of more than two TPC commands known by the first device and the second device, and each TPC command in the set of more than two TPC commands being mapped to an up or down command with a unique step size, the unique step size adapted to compensate for an identified trend that is associated with a reduced TPC rate, the reduced TPC rate based at least in part on scaling a normal TPC rate for a normal bandwidth carrier system with a bandwidth scaling factor associated with a flexible bandwidth carrier system, wherein the TPC rate is associated with a rate at which the more than two TPC commands are sent; and adjusting a transmit power of the first device based on the identified TPC command.

36. The method of claim 35, wherein a number of TPC commands from the set of more than two TPC commands mapped to up commands is the same as the number of TPC commands from the set of more than two TPC commands mapped to down commands.

37. The method of claim 35, wherein the difference in the unique step size between any two up commands or any two down commands is a constant.

38. A wireless communications system, comprising:

means for identifying in a first device, a TPC command sent from a second device, the identified TPC command being from a set of more than two TPC commands known by the first device and the second device, and each TPC command in the set of more than two TPC commands being mapped to an up or down command with a unique step size, the unique step size adapted to compensate for an identified trend that is associated with a reduced TPC rate, the reduced TPC rate based at least in part on scaling a normal TPC rate for a normal bandwidth carrier system with a bandwidth scaling factor associated with a flexible bandwidth carrier system, wherein the TPC rate is associated with a rate at which the more than two TPC commands are sent; and means for adjusting a transmit power of the first device based on the identified TPC command.

39. A wireless communications device, comprising:
at least one processor communicatively coupled with a memory, the memory comprising executable code that, when executed by the at least one processor, causes the at least one processor to:
identify in a first device, a TPC command sent from a second device, the identified TPC command being from a set of more than two TPC commands known by the first device and the second device, and each TPC command in the set of more than two TPC commands being mapped to an up or down command with a unique step size, the unique step size adapted to compensate for an identified trend that is associated with a reduced TPC rate, the reduced TPC rate based at least in part on scaling a normal TPC rate for a normal bandwidth carrier system with a bandwidth scaling factor associated with a flexible bandwidth carrier system, wherein the TPC rate is associated with a rate at which the more than two TPC commands are sent; and
adjust a transmit power of the first device based on the identified TPC command.

40. A computer program product for transmit power control (TPC) in a wireless communications system, comprising:
a non-transitory computer-readable medium comprising:
code configured to identify in a first device, a TPC command sent from a second device, the identified TPC command being from a set of more than two TPC commands known by the first device and the second device, and each TPC command in the set of more than two TPC commands being mapped to an up or down command with a unique step size, the unique step size adapted to compensate for an identified trend that is associated with a reduced TPC rate, the reduced TPC rate based at least in part on scaling a normal TPC rate for a normal bandwidth carrier system with a bandwidth scaling factor associated with a flexible bandwidth carrier system, wherein the TPC rate is associated with a rate at which the more than two TPC commands are sent; and
code configured to adjust a transmit power of the first device based on the identified TPC command.

* * * * *